(12) United States Patent
Smith et al.

(10) Patent No.: US 9,348,103 B2
(45) Date of Patent: *May 24, 2016

(54) LOW PROFILE FIBER DISTRIBUTION HUB

(71) Applicant: CommScope Technologies LLC, Hickory, NC (US)

(72) Inventors: Trevor D. Smith, Eden Prairie, MN (US); Jonathan R. Kaml, Shakopee, MN (US); Scott C. Kowalczyk, Savage, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/312,120

(22) Filed: Jun. 23, 2014

(65) Prior Publication Data

US 2015/0078718 A1 Mar. 19, 2015

Related U.S. Application Data

(63) Continuation of application No. 12/827,423, filed on Jun. 30, 2010, now abandoned, which is a continuation of application No. 12/241,576, filed on Sep. 30, 2008, now Pat. No. 7,751,672.

(60) Provisional application No. 60/984,356, filed on Oct. 31, 2007.

(51) Int. Cl.
*G02B 6/00* (2006.01)
*G02B 6/44* (2006.01)

(52) U.S. Cl.
CPC .............. *G02B 6/445* (2013.01); *G02B 6/4452* (2013.01)

(58) Field of Classification Search
CPC .............................. G02B 6/445; G02B 6/4452
USPC .......................................................... 385/135
See application file for complete search history.

(56) References Cited

U.S. PATENT DOCUMENTS

| | | | |
|---|---|---|---|
| 4,747,020 A | 5/1988 | Brickley et al. |
| 4,765,710 A | 8/1988 | Burmeister et al. |
| 4,792,203 A | 12/1988 | Nelson et al. |
| 4,995,688 A | 2/1991 | Anton et al. |

(Continued)

FOREIGN PATENT DOCUMENTS

| | | |
|---|---|---|
| DE | G 9105800 U1 | 6/1991 |
| EP | 1 692 556 | 8/2006 |

(Continued)

OTHER PUBLICATIONS

ADC FONS Outdoor Distribution Enclosure (ODE-13) Installation Instructions, Issue 1, 20 pages (Jun. 2006).

(Continued)

*Primary Examiner* — Ryan Lepisto
(74) *Attorney, Agent, or Firm* — Merchant & Gould P.C.

(57) ABSTRACT

Certain embodiments of a fiber distribution hub include a swing frame pivotally mounted within an enclosure having a low profile. For example, the enclosure can have a depth of less than about nine inches. Termination modules can be mounted to the swing frame and oriented to slide at least partially in a front-to-rear direction to facilitate access to connectors plugged into the termination modules. Splitter modules and connector storage regions can be provided within the enclosure.

19 Claims, 30 Drawing Sheets

(56) References Cited

U.S. PATENT DOCUMENTS

| | | |
|---|---|---|
| 5,100,221 A | 3/1992 | Carney et al. |
| 5,129,030 A | 7/1992 | Petrunia |
| 5,179,618 A | 1/1993 | Anton |
| 5,274,731 A | 12/1993 | White |
| 5,289,558 A | 2/1994 | Teichler et al. |
| 5,363,465 A | 11/1994 | Korkowski et al. |
| 5,367,598 A | 11/1994 | Devenish, III et al. |
| RE34,955 E | 5/1995 | Anton et al. |
| 5,442,726 A | 8/1995 | Howard et al. |
| 5,448,015 A | 9/1995 | Jamet et al. |
| 5,497,444 A | 3/1996 | Wheeler |
| 5,511,144 A | 4/1996 | Hawkins et al. |
| 5,636,138 A | 6/1997 | Gilbert et al. |
| 5,708,751 A | 1/1998 | Mattei |
| 5,717,810 A | 2/1998 | Wheeler |
| 5,734,774 A | 3/1998 | Morrell |
| 5,784,515 A | 7/1998 | Tamaru et al. |
| 5,823,646 A | 10/1998 | Arizpe et al. |
| 5,945,633 A | 8/1999 | Ott et al. |
| 6,044,193 A | 3/2000 | Szentesi et al. |
| 6,061,492 A | 5/2000 | Strause et al. |
| 6,160,946 A | 12/2000 | Thompson et al. |
| 6,208,796 B1 | 3/2001 | Williams Vigliaturo |
| 6,236,795 B1 | 5/2001 | Rodgers |
| 6,256,443 B1 | 7/2001 | Uruno et al. |
| 6,278,829 B1 | 8/2001 | BuAbbud et al. |
| RE37,489 E | 1/2002 | Anton et al. |
| 6,356,697 B1 | 3/2002 | Braga et al. |
| 6,363,200 B1 | 3/2002 | Thompson et al. |
| 6,385,381 B1 | 5/2002 | Janus et al. |
| 6,424,781 B1 | 7/2002 | Puetz et al. |
| 6,434,313 B1 | 8/2002 | Clapp, Jr. et al. |
| 6,535,682 B1 | 3/2003 | Puetz et al. |
| 6,556,763 B1 | 4/2003 | Puetz et al. |
| 6,591,051 B2 | 7/2003 | Solheid et al. |
| 6,621,975 B2 | 9/2003 | Laporte et al. |
| 6,631,237 B2 | 10/2003 | Knudsen et al. |
| 6,661,961 B1 | 12/2003 | Allen et al. |
| 6,711,339 B2 | 3/2004 | Puetz et al. |
| 6,715,719 B2 | 4/2004 | Nault et al. |
| 6,760,530 B1 | 7/2004 | Mandry |
| 6,760,531 B1 | 7/2004 | Solheid et al. |
| 6,778,752 B2 | 8/2004 | Laporte et al. |
| 6,788,786 B1 | 9/2004 | Kessler et al. |
| 6,792,190 B2 | 9/2004 | Xin et al. |
| 6,792,191 B1 | 9/2004 | Clapp, Jr. et al. |
| 6,845,207 B2 | 1/2005 | Schray |
| 6,850,685 B2 | 2/2005 | Tinucci et al. |
| 6,853,795 B2 | 2/2005 | Dagley et al. |
| 6,870,734 B2 | 3/2005 | Mertesdorf et al. |
| 6,909,833 B2 | 6/2005 | Henschel et al. |
| 6,920,213 B2 | 7/2005 | Pershan |
| 6,920,274 B2 | 7/2005 | Rapp et al. |
| 6,925,241 B2 | 8/2005 | Bohle et al. |
| 6,968,111 B2 | 11/2005 | Trebesch et al. |
| 6,980,725 B1 | 12/2005 | Swieconek |
| 6,983,095 B2 | 1/2006 | Reagan et al. |
| 7,086,539 B2 | 8/2006 | Knudsen et al. |
| 7,088,899 B2 | 8/2006 | Reagan et al. |
| 7,103,255 B2 | 9/2006 | Reagan et al. |
| 7,139,461 B2 | 11/2006 | Puetz et al. |
| 7,142,763 B2 | 11/2006 | Frohlich et al. |
| 7,142,764 B2 | 11/2006 | Allen et al. |
| 7,146,089 B2 | 12/2006 | Reagan et al. |
| 7,149,398 B2 | 12/2006 | Solheid et al. |
| 7,171,102 B2 | 1/2007 | Reagan et al. |
| 7,194,181 B2 | 3/2007 | Holmberg et al. |
| 7,198,409 B2 | 4/2007 | Smith et al. |
| 7,200,317 B2 | 4/2007 | Reagan et al. |
| 7,218,827 B2 | 5/2007 | Vongseng et al. |
| 7,233,731 B2 | 6/2007 | Solheid et al. |
| 7,245,809 B1 | 7/2007 | Gniadek et al. |
| 7,277,620 B2 | 10/2007 | Vongseng et al. |
| 7,298,952 B2 | 11/2007 | Allen et al. |
| 7,333,707 B2 | 2/2008 | Puetz et al. |
| 7,346,254 B2 | 3/2008 | Kramer et al. |
| 7,352,945 B2 | 4/2008 | Holmberg et al. |
| 7,366,391 B2 | 4/2008 | Ellison et al. |
| 7,369,741 B2 | 5/2008 | Reagan et al. |
| 7,376,322 B2 | 5/2008 | Zimmel et al. |
| 7,376,323 B2 | 5/2008 | Zimmel |
| 7,400,813 B2 | 7/2008 | Zimmel |
| 7,400,816 B2 | 7/2008 | Reagan et al. |
| 7,407,330 B2 | 8/2008 | Smith et al. |
| 7,416,349 B2 | 8/2008 | Kramer |
| 7,418,181 B2 | 8/2008 | Zimmel et al. |
| 7,419,384 B2 | 9/2008 | Neumetzler et al. |
| 7,457,503 B2 | 11/2008 | Solheid et al. |
| 7,471,869 B2 | 12/2008 | Reagan et al. |
| 7,492,575 B2 | 2/2009 | Irmer et al. |
| 7,515,805 B2 | 4/2009 | Vongseng et al. |
| 7,519,259 B2 | 4/2009 | Smith et al. |
| 7,522,805 B2 * | 4/2009 | Smith .................. G02B 6/4452 385/135 |
| 7,526,172 B2 | 4/2009 | Gniadek et al. |
| 7,623,749 B2 | 11/2009 | Reagan et al. |
| 7,646,958 B1 | 1/2010 | Reagan et al. |
| 7,751,672 B2 * | 7/2010 | Smith .................... G02B 6/445 385/134 |
| 2002/0150372 A1 | 10/2002 | Schray |
| 2005/0129379 A1 | 6/2005 | Reagan et al. |
| 2006/0008231 A1 | 1/2006 | Reagan et al. |
| 2007/0025675 A1 | 2/2007 | Kramer |
| 2007/0031100 A1 * | 2/2007 | Garcia ................. G02B 6/4452 385/135 |
| 2007/0147765 A1 | 6/2007 | Gniadek et al. |
| 2007/0165995 A1 | 7/2007 | Reagan et al. |
| 2007/0189691 A1 | 8/2007 | Barth et al. |
| 2007/0192817 A1 | 8/2007 | Landry et al. |
| 2008/0008436 A1 | 1/2008 | Reagan et al. |
| 2008/0031585 A1 | 2/2008 | Solheid et al. |
| 2008/0042535 A1 | 2/2008 | Guzzo et al. |
| 2008/0042536 A1 | 2/2008 | Guzzo et al. |
| 2008/0145013 A1 * | 6/2008 | Escoto et al. .................. 385/135 |
| 2008/0219633 A1 | 9/2008 | Smith et al. |
| 2008/0298762 A1 | 12/2008 | Hawley et al. |
| 2008/0317425 A1 | 12/2008 | Smith et al. |
| 2009/0022467 A1 | 1/2009 | Puetz et al. |
| 2009/0074372 A1 | 3/2009 | Solheid et al. |
| 2009/0087157 A1 | 4/2009 | Smith et al. |
| 2009/0190896 A1 | 7/2009 | Smith et al. |
| 2009/0196565 A1 | 8/2009 | Vongseng et al. |

FOREIGN PATENT DOCUMENTS

| | | |
|---|---|---|
| JP | 3307618 | 5/2002 |
| JP | 3761762 | 1/2006 |
| WO | WO 99/27404 | 6/1999 |
| WO | WO 2007/095037 A2 | 8/2007 |

OTHER PUBLICATIONS

European Search Report mailed Nov. 4, 2010.
Fiber Jointing Cabinet NCD 518 8002, *Ericsson Network Technologies AB*, pp. 1-2 (2006).
International Search Report and Written Opinion mailed Jun. 30, 2009.
Invitation to Pay Additional Fees with Partial International Search mailed Apr. 22, 2009.
OmniReach™ FTTX Solutions Indoor FDH 3000, *ADC Telecommunications, Inc.*, pp. 1-4 (Aug. 2007).
Outdoor Fiber Jointing Cabinet NBD 11601, *Ericsson Network Technologies AB*, pp. 1-3 (2006).
Turner, C., "Cleaning Up the FTTH Neighborhood," *Broadband Properties*, pp. 44-45 (Apr. 2006).
U.S. Appl. No. 12/426,723, filed Apr. 20, 2009 entitled "Parking in Fiber Distribution Hubs" inventors: Reagan et al.
U.S. Appl. No. 12/435,170, filed May 4, 2009 entitled "Fiber Distribution Hub" inventors: Reagan et al.
U.S. Appl. No. 12/435,181, filed May 4, 2009 entitled "Fiber Distribution Device" inventors: Reagan et al.

* cited by examiner

LOW PROFILE FIBER DISTRIBUTION HUB

CROSS-REFERENCE TO RELATED APPLICATION

This application is a continuation of U.S. patent application Ser. No. 12/827,423, filed Jun. 30, 2010, which is a continuation of U.S. patent application Ser. No. 12/241,576, filed Sep. 30, 2008, now issued as U.S. Pat. No. 7,751,672, which claims the benefit of U.S. Provisional Patent Application Ser. No. 60/984,356, filed Oct. 31, 2007, which applications are hereby incorporated by reference in their entirety.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 100 deploying passive fiber optic lines. As shown, the network 100 can include a central office 110 that connects a number of end subscribers 115 (also called end users 115 herein) in a network. The central office 110 can additionally connect to a larger network such as the Internet (not shown) and a public switched telephone network (PSTN). The network 100 also can include fiber distribution hubs (FDHs) 130 having one or more optical splitters (e.g., 1-to-8 splitters, 1-to-16 splitters, or 1-to-32 splitters) that output a number of individual fibers that may lead to the premises of an end user 115. The various lines of the network can be aerial or housed within underground conduits.

The portion of the network 100 that is closest to the central office 110 is generally referred to as the F1 region, where F1 is the "feeder fiber" from the central office. The F1 portion of the network may include a distribution cable 120 having on the order of 12 to 48 fibers; however, alternative implementations can include fewer or more fibers. The portion of the network 100 that includes an FDH 130 and a number of end users 115 can be referred to as an F2 portion of the network 100. The network 100 includes one or more break-out locations 125 at which branch cables are separated out from main cable lines. Branch cables are often connected to drop terminals 104 that include connector interfaces for facilitating coupling the fibers of the branch cables to a plurality of different subscriber locations.

Splitters used in an FDH 130 can accept a feeder cable having a number of fibers and may split those incoming fibers into, for example, 216 to 432 individual distribution fibers that may be associated with a like number of end user locations. In typical applications, an optical splitter is provided prepackaged in an optical splitter module housing and provided with splitter output pigtails that extend from the module. The splitter output pigtails are typically connectorized with, for example, SC, LC, or LX.5 connectors. The optical splitter module provides protective packaging for the optical splitter components in the housing and thus provides for easy handling for otherwise fragile splitter components. This modular approach allows optical splitter modules to be added incrementally to FDHs 130 as required.

The FDHs 130 may be provided in outdoor or indoor environments. For example, some FDHs 130 may be mounted on pedestals or posts outdoors. Other FDHs 130, however, are installed in compact spaces in which room may be limited. For example, an FDH 130 may be mounted within a closet or other enclosed space in which a bulky cabinet can be detrimental. Accordingly, an FDH 130 having reduced dimensions may be beneficial.

SUMMARY

Certain aspects of the disclosure relate to fiber distribution hubs (FDHs) that provide an interface between the F1 portion of the network and an F2 portion of the network. Certain aspects relate to features that reduce the profile and other dimensions of the FDH. Other aspects relate to features adapted to enhance access to components within the FDHs. Still other aspects relate to features that enhance cable management, ease of use, and scalability.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

Referring to the drawing, wherein like numerals represent like parts throughout the several views.

DETAILED DESCRIPTION

Figure 6:
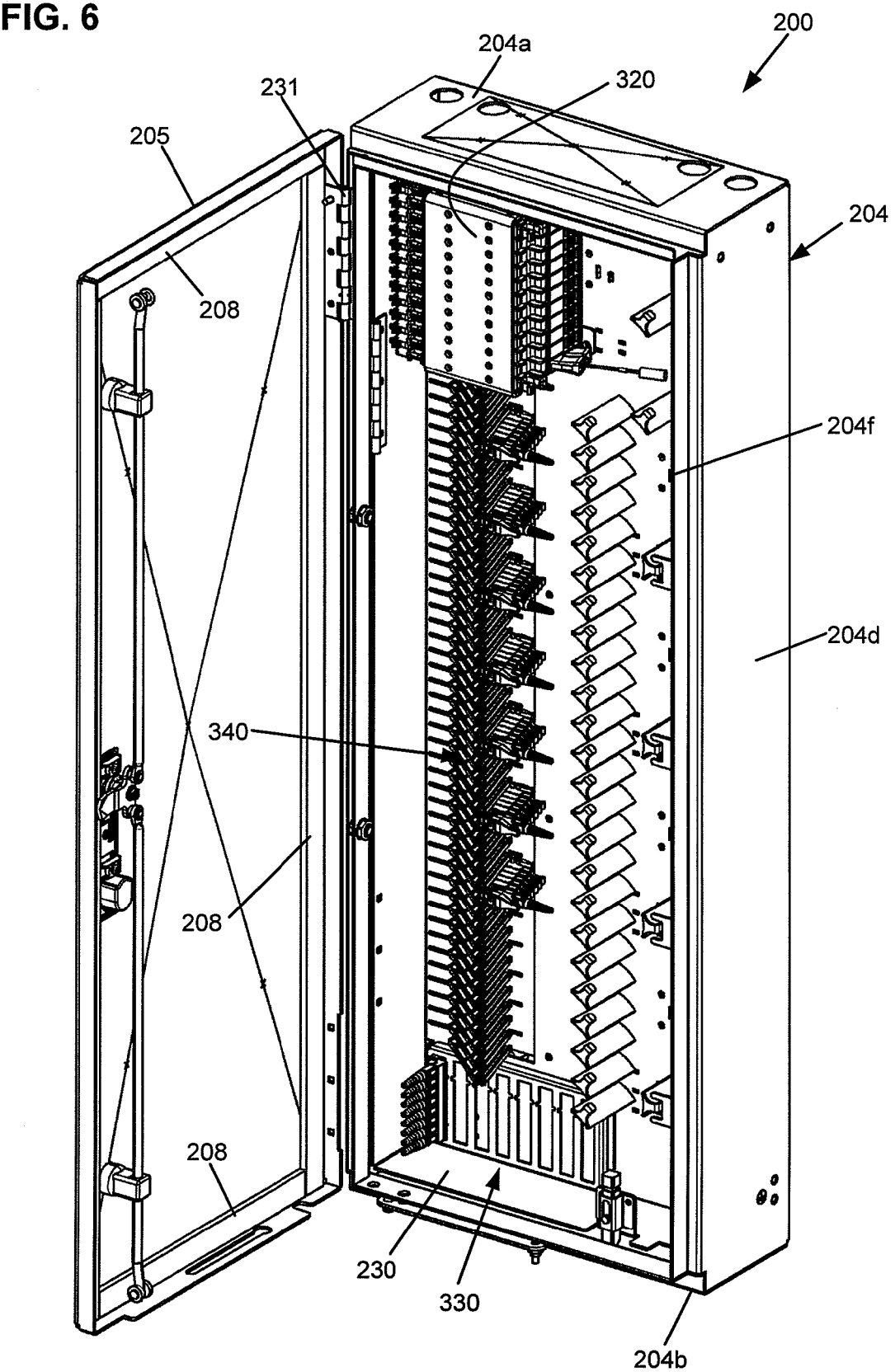
FIG. 6 is a front, top isometric view of the example FDH of FIG. 2 with the door arranged in an open position to facilitate access to telecommunication components mounted to a front side of a swing frame arranged in a first position within the FDH in accordance with the principles of the present disclosure.

The present disclosure relates to a fiber distribution hub 200 having a generally rectangular, low profile enclosure 202 (see FIGS. 2-5). The enclosure 202 has a generally rectangular main body 204 having a top wall 204a (FIG. 3), a bottom wall 204b (FIG. 3), a first side wall 204c (FIG. 4), a second side wall 204d (FIG. 2), and a back wall 204e (FIG. 3) defining an interior. The body 204 also defines a generally open front side 204f (FIG. 6) opposite the back wall 204e.

The enclosure 202 also includes a door 205 typically mounted at the open front side 204f of the main body 204. The door 205 is pivotally movable from an open position (see FIG. 6) in which the interior of the enclosure 202 can be accessed to a closed position (see FIGS. 2-5) in which the open front side 204f of the main body 204 is at least partially covered. In one embodiment, the enclosure 202 can include two or more doors 205 covering the open front side 204f. A seal 208 (FIG. 6) can be provided at the interface between the door 205 and the main body 204 for sealing the enclosure 202 when the door 205 is closed. In the example shown in FIG. 6, the seal 208 is mounted to the back side of the door 205.

In general, each enclosure 202 can include one or more telecommunications components including telecommunications circuits (e.g., optical outputs to subscribers). For example, in one embodiment, an example enclosure can include at least 32 circuits (e.g., 32 fiber optic adapters such that the enclosure can provide 32 outputs to subscriber locations). In another embodiment, an example enclosure can include at least 64 circuits (e.g., 64 fiber optic adapters such that the enclosure can provide 64 outputs to subscriber locations). In another embodiment, an example enclosure can include at least 72 circuits (e.g., 72 fiber optic adapters such that the enclosure can provide 22 outputs to subscriber locations). In another embodiment, an example enclosure can include at least 96 circuits (e.g., 96 fiber optic adapters such that the enclosure can provide 96 outputs to subscriber locations). In another embodiment, an example enclosure can include at least 144 circuits (e.g., 144 fiber optic adapters such that the enclosure can provide 144 outputs to subscriber locations). In another embodiment, an example enclosure can include at least 288 circuits (e.g., 288 fiber optic adapters such that the enclosure can provide 288 outputs to subscriber locations). In another embodiment, an example enclosure can include at least 576 circuits (e.g., 576 fiber optic adapters such that the enclosure can provide 576 outputs to subscriber locations). In each of these embodiments, the enclosures can have depths less than 9 inches. While for low profile applications it is desireable for the enclosures have depths less than 9 inches, other embodiments of the present enclosure may have depths greater than 9 inches.

The low profile enclosure 202 is preferably sized to be placed in a location, such as a closet, without occupying a large amount of space. In general, the depth D of the enclosure 202 is kept small to enhance the ability of the enclosure 202 to fit within a compact space. In one embodiment, the enclosure 202 can have a depth D of less than or equal to about 9 inches (e.g., about 23 centimeters). In another embodiment, the enclosure 202 can have a depth D of less than or equal to about 8 inches (e.g., about 20 centimeters). In yet another embodiment, the enclosure 202 can have a depth D of less than or equal to about 7 inches (e.g., about 18 centimeters).

The width W and height H of the enclosure 202 can vary depending upon the number of circuits present in the fiber distribution hub 200. In certain embodiments, the height H of the enclosure 202 is greater than the width W, which is greater than the depth D (see FIG. 2). In some embodiments, the height H of the enclosure 202 is at least twice the width W of the enclosure 202. In other embodiments, the height H is at least four times greater than the depth D of the enclosure 202. In other embodiments, the height H is at least five times greater than the depth D. In other embodiments, the height H of the enclosure 202 is at least three times greater than the depth D and the width W of the enclosure 202 is at least 1.5 times the depth D. In still other embodiments, the width W of the enclosure 202 is at least twice the depth D. In further embodiments, the height H of the enclosure 202 is at least 5 times as large as the depth D and the width W of the enclosure 202 is at least two times as large as the depth D.

For example, in one example embodiment of an FDH 200, the enclosure 202 can have a depth D of about 7 inches, a height H of about 32 inches (e.g., about 81 centimeters), and a width W of about 15 inches (e.g., about 38 centimeters). In another example embodiment of an FDH 200, the enclosure 202 can have a depth D of about 7 inches, a height H of about 41 inches (e.g., 104 centimeters), and a width W of about 15 inches. In yet another example embodiment of an FDH 200, the enclosure 202 can have a depth D of about 7 inches, a width W of about 30 inches (e.g., about 76 centimeters), and a height H of about 41 inches. In other embodiments, example FDHs 200 have depths D of less than about 9 inches, widths W of greater than 9 inches, and heights H greater than the widths W.

Figure 10:
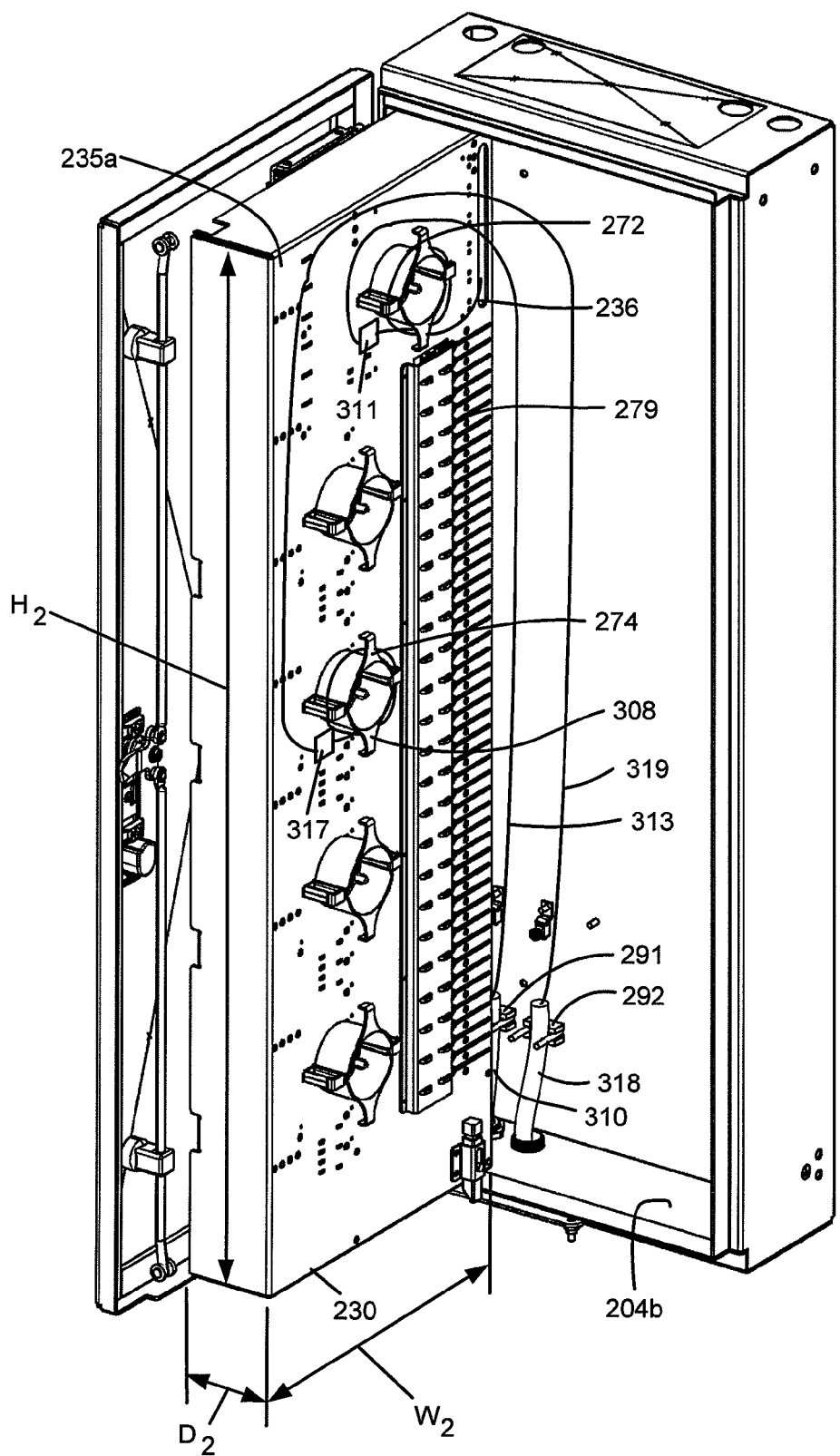
FIG. 10 is a front, top isometric view of the example FDH of FIG. 6 with the swing frame having been pivoted from the first position within the FDH through the open front side to a second position such that a rear side of the swing frame is accessible in accordance with the principles of the present disclosure.

The fiber distribution hub 200 includes a swing frame 230 pivotally mounted within the enclosure 202 (see FIG. 10). The swing frame 230 has a front side 233 and a rear side 234. In one embodiment, the swing frame 230 is connected to the enclosure 202 by a hinge arrangement 231 defining a vertical hinge axis 232 located adjacent a front corner of the main body 204 of the low profile enclosure 202 (see FIG. 6). The vertical hinge axis 232 allows the swing frame 230 to be swung between a first position (see FIG. 6) in which the swing frame 230 is arranged completely within the main body 204 of the enclosure 202 and a second position (see FIG. 10) in which the swing frame 230 is pivoted through the open front side 204f of the main body 204 such that the rear side 234 of the swing frame 230 is accessible.

A number of telecommunications components can be mounted on the swing frame 230. In the example shown in FIG. 6, a splitter mounting location 320 for mounting fiber optic splitter modules 325 (FIG. 8) is located adjacent the top of the swing frame 230. A termination field 340 is located beneath the splitter mounting location 320. A connector storage location 330 is positioned beneath the termination field 340 on the swing frame 230. One or more vertical cable management channels 350 (FIG. 7) extend vertically along the swing frame 230. In other embodiments, however, the telecommunication components can be mounted to the swing frame 230 in different configurations.

The FDH 200 generally administers connections at a termination panel between incoming fiber and outgoing fiber. As the term is used herein, "a connection" between fibers includes both direct and indirect connections. Examples of incoming fibers include the fibers of a feeder cable that enters the enclosure 202 and intermediate fibers that connect the feeder cable fibers to the termination region. Examples of such intermediate fibers include connectorized pigtails extending from one or more splitters and fibers that extend from a splitter and that are spliced or otherwise connected to the feeder cable. Examples of outgoing fibers include the fibers of the subscriber cable that exit the enclosure 202 and any intermediate fibers that connect the subscriber cable fibers to the termination region.

Figure 1:
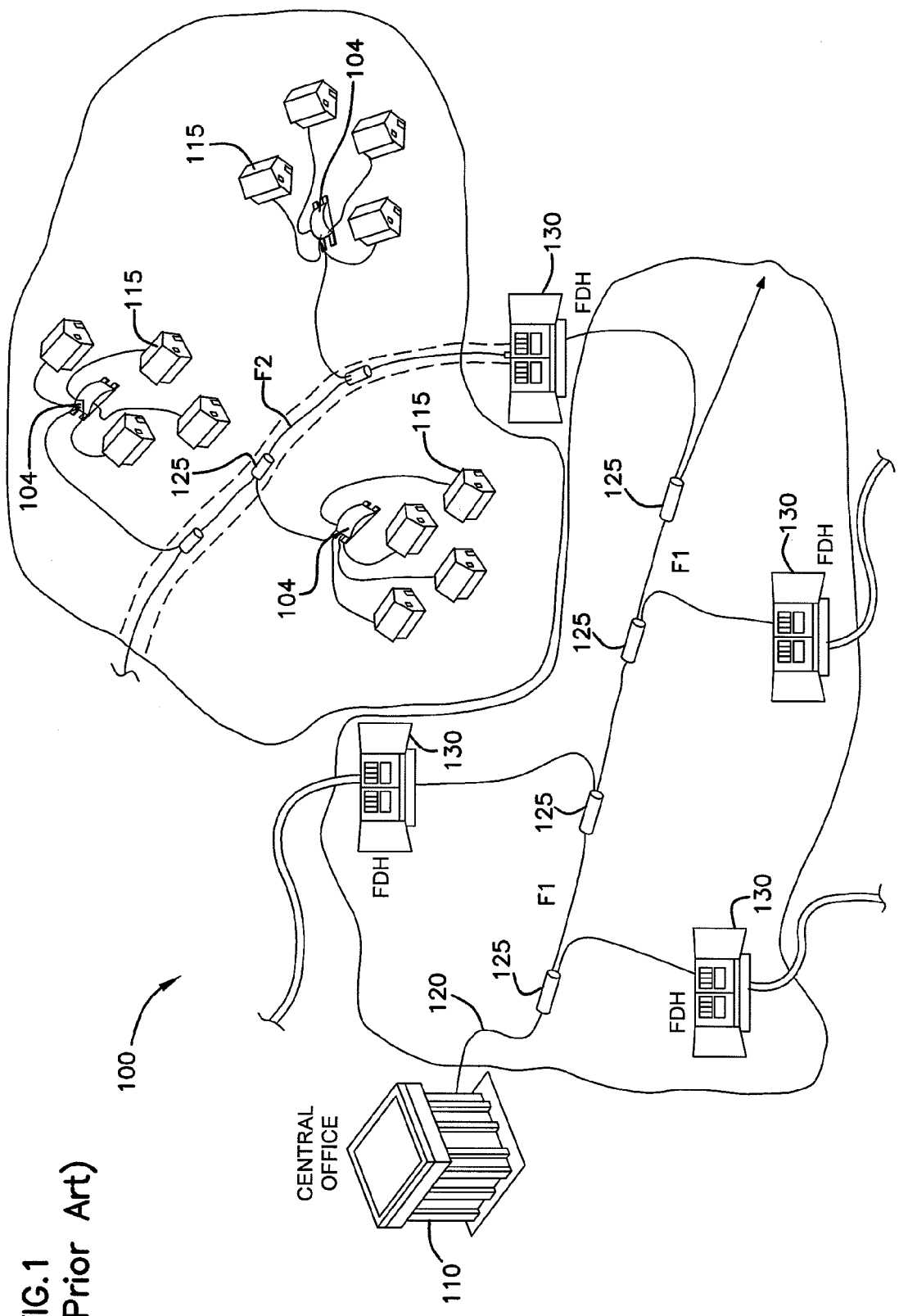
FIG. 1 illustrates a network deploying passive fiber optic lines and including a central office that connects a number of end subscribers (also called end users herein) in a network in accordance with the principles of the present disclosure.
Figure 2:
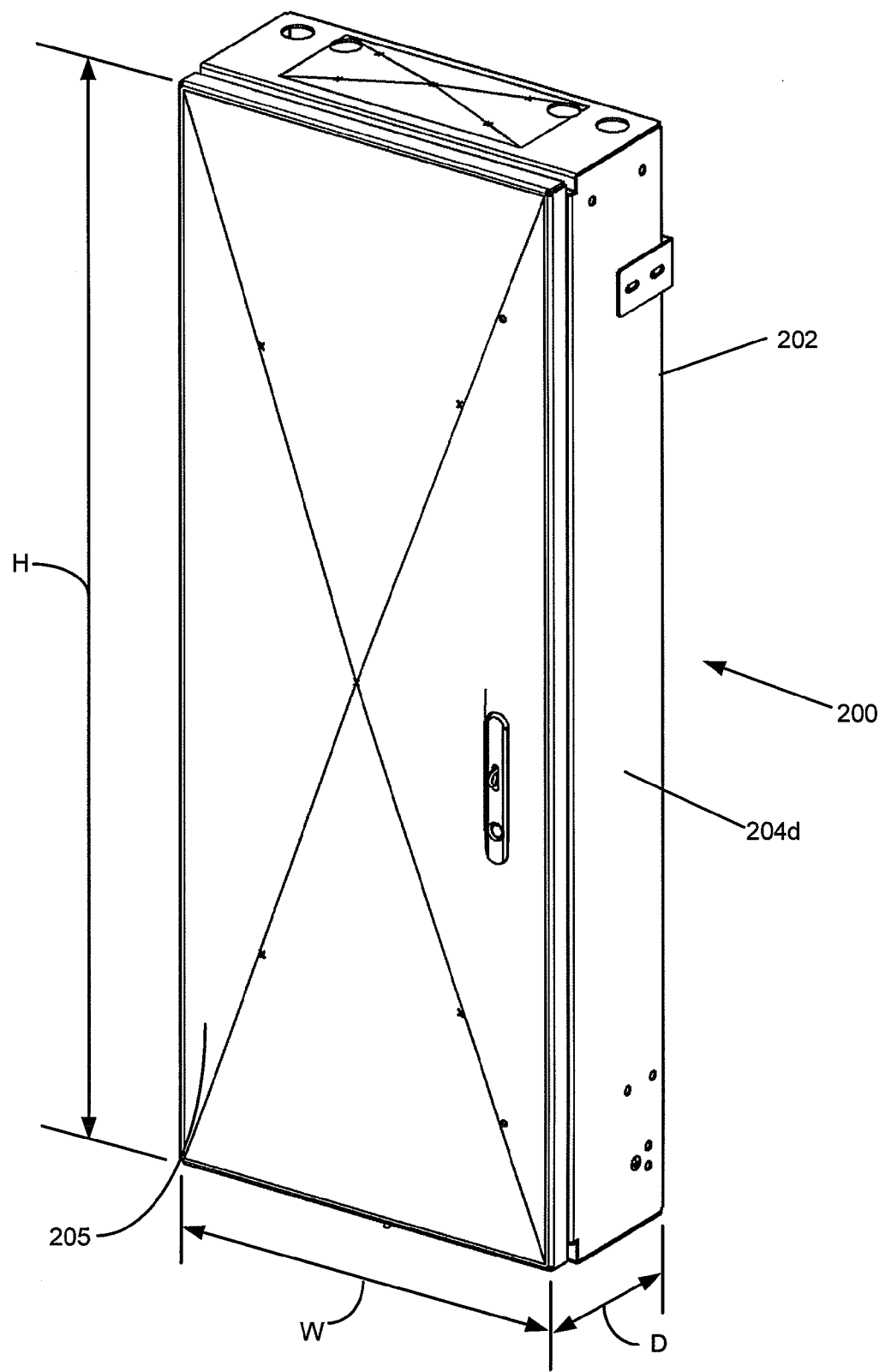
FIG. 2 is a front, top isometric view of an example fiber distribution hub (FDH) including a body and a door in accordance with the principles of the present disclosure.
Figure 3:
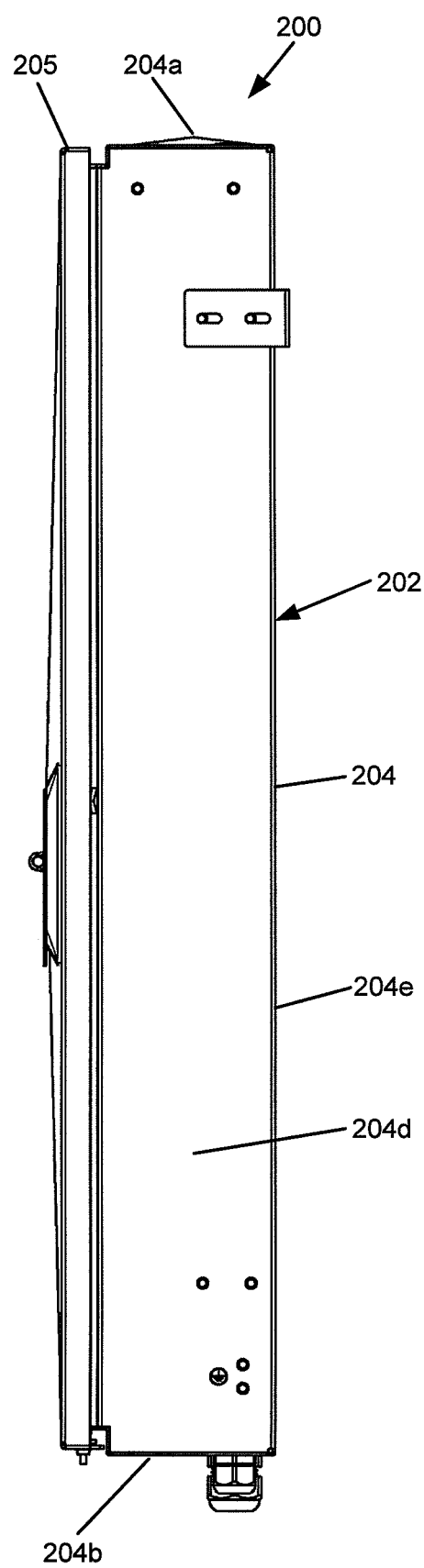
FIG. 3 is a side elevational view of the example FDH of FIG. 2 in accordance with the principles of the present disclosure.
Figure 4:
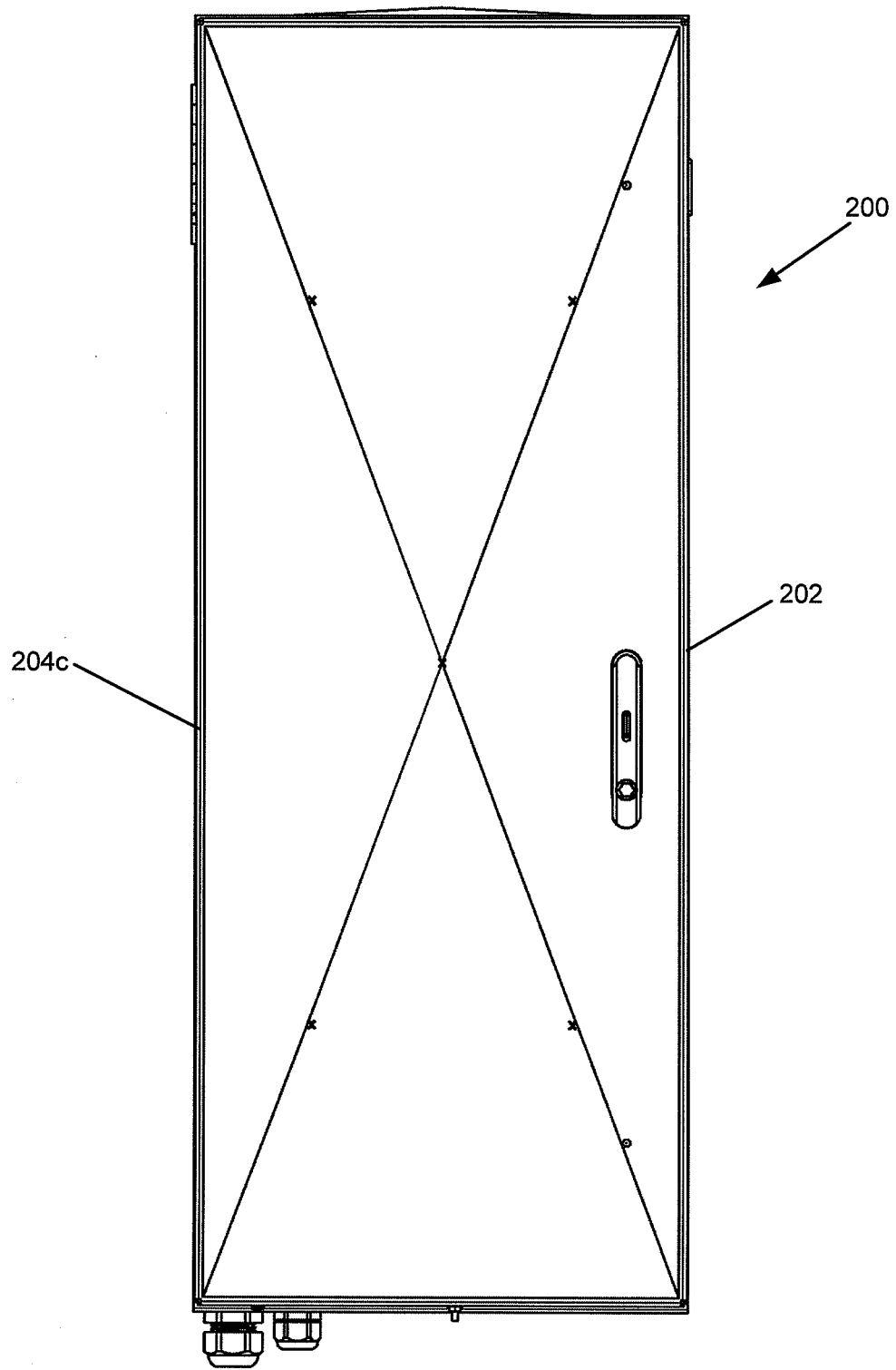
FIG. 4 is a front view of the example FDH of FIG. 2 in accordance with the principles of the present disclosure.
Figure 5:
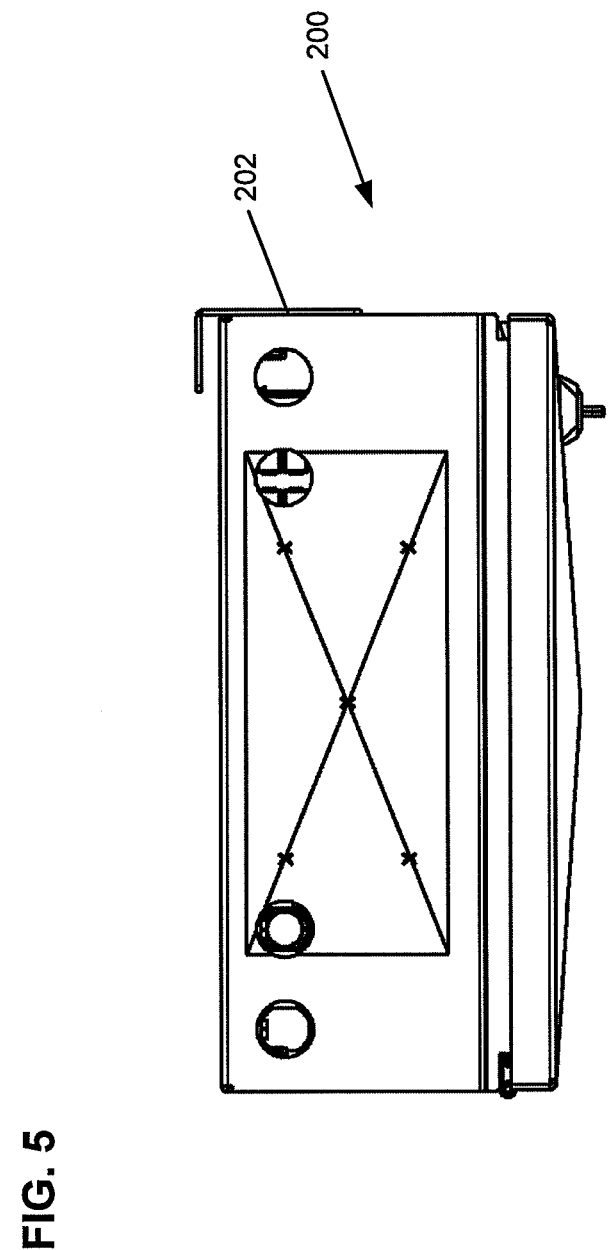
FIG. 5 is a top plan view of the example FDH of FIG. 2 in accordance with the principles of the present disclosure.

The termination region (e.g., termination field 340 of FIG. 6) of the FDH 200 provides an interconnect interface for optical transmission signals at a location in the network where operational access and reconfiguration are desired. For example, as noted above, the FDH 200 can be used to split the feeder cables and terminate the split feeder cables to distribution cables routed to subscriber locations 115 (FIG. 1). In addition, the FDH 200 is designed to accommodate a range of alternative sizes and fiber counts and support factory installation of pigtails, fanouts, and splitters.

Figure 7:
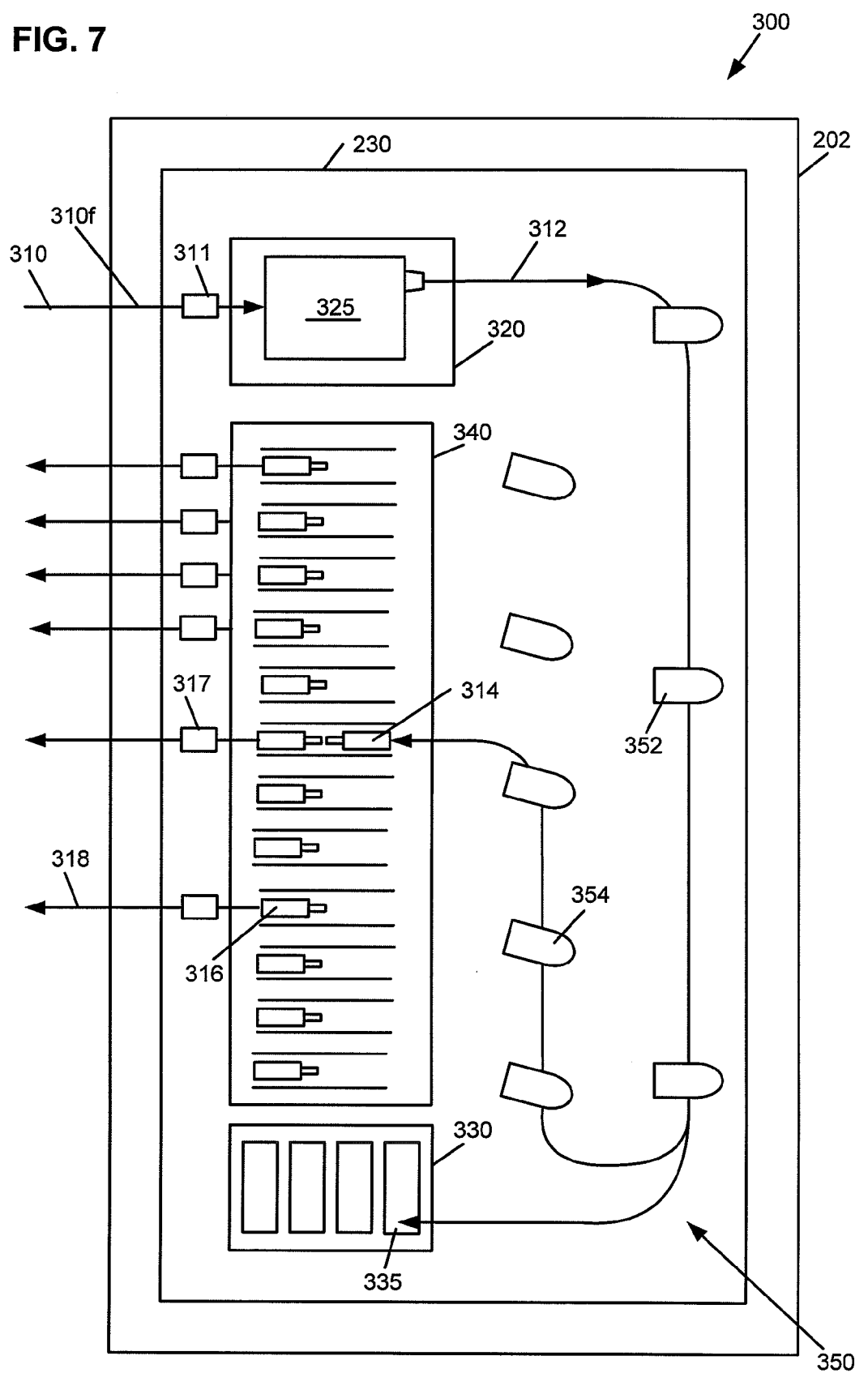
FIG. 7 is schematic diagram showing an example cable routing scheme for an example FDH in accordance with the principles of the present disclosure.

FIG. 7 is schematic diagram showing an example cable routing scheme 300 for the FDH 200. As shown at FIG. 7, a feeder cable 310 can be routed initially through the enclosure 202 (e.g., typically through the back or bottom of the main body 204 as shown in FIG. 10). In the example shown, the jacket of the cable can be clamped to the enclosure and fibers 310f of the feeder cable 310 can be routed onto the swing frame 230. In certain embodiments, the fibers 310f of the feeder cable 310 can include ribbon fibers. An example feeder cable 310 may include twelve to forty-eight individual fibers 310f connected to a service provider central office 110 (FIG. 1).

After being routed to the swing frame 230, the fibers 310f of the feeder cable 310 can be routed to a fanout device 311 arranged on the swing frame 230. The fanout device 311 separates the fibers 310f of the feeder cable 310. The fanout device 311 also can upjacket the fibers 310f of the feeder cable 310. In some embodiments, the separated fibers 310f of the feeder cable 310 are routed from the fanout device 311 to the splitter region 320. At the splitter region 320, the feeder cable fibers 310f are connected to separate splitter modules 325, in which signals carried over the feeder cable fibers 310f are each split into multiple signals carried over splitter pigtails 312, each having a connectorized end 314. The ends of the fibers 310f can be connectorized and can be connected to the splitter moduels by fiber optic adapters. A typical splitter pigtail 312 includes a coated, and possibly buffered, fiber, a jacket covering the fiber, and strength members (e.g., aramid yarn) positioned between the fiber and the jacket.

In other embodiments, however, the fibers of the feeder cable 310 can be routed to a feeder cable interface (e.g., a fiber optic adapter module, a splice tray, a multi-termination connector, etc.). At the feeder cable interface (not shown), one or more of the fibers of the feeder cable 310 are individually connected to separate intermediate splitter input fibers (not shown) that are routed to the splitter region 320.

When the splitter pigtails 312 are not in service, the connectorized ends 314 can be temporarily stored on a storage module 335 that is mounted at the storage region 330 of the swing frame 230. When the pigtails 312 are needed for service, the pigtails 312 are routed from the splitter modules 325 to a termination module 345 that is provided at the termination region 340 of the swing frame 230. The termination module 345 is the dividing line between the incoming fibers and the outgoing fibers. A typical distribution cable 318 forms the F2 portion of a network (see FIG. 1) and typically includes a plurality of fibers (e.g., 144, 216, or 432 fibers) that are routed from the FDHs 130 to subscriber locations 115 (FIG. 1).

At the termination module 345, the connectorized ends 314 of the splitter pigtails 312 are connected to the connectorized ends 316 of fibers optically coupled (i.e., linked) with the distribution cable 318. These fibers may be ribbonized at a fanout 317 provided on the swing frame 230. In some embodiments, the connectorized ends 316 terminate the fibers of the distribution cable 318. In other embodiments, the connectorized ends 316 are provided at the ends of intermediate fibers that couple to a distribution cable 318. For example, in one embodiment, the intermediate fibers may be spliced to fibers of a distribution cable 318 at a location within the enclosure (e.g., at splice trays mounted to the back wall of the enclosure). In other embodiments, the connectorized ends 316 are provided at the ends of fibers of a stub cable that is routed out of the cabinet and spliced or otherwise connected to fibers of a distribution cable at aq location outside the enclosure. In a further embodiment, the intermediate fibers may be terminated with a multi-termination connector (i.e., a multi-fiber connector) which can be optically coupled to a subscriber cable terminated at a multi-termination connector. Further details regarding multi-fiber connector-terminated intermediate fibers can be found in copending U.S. application Ser. No. 11/513,910, filed Aug. 30, 3006 as "Fiber distribution hub with modular termination blocks," the disclosure of which is hereby incorporated herein by reference.

In some embodiments, one or more fibers of the feeder cable 310 are not connected to any of the splitter modules 325. Rather, these fibers of the feeder cable 310 are connected through an interface device to pass-through fibers (not shown) having connectorized ends. The connectorized ends of the pass-through fibers are connected to the connectorized ends 316 of the subscriber cable fibers 318 at the termination region 340 of the swing frame 230 without first connecting to the splitter region 320. By refraining from splitting a fiber 310, a stronger signal can be sent to one of the subscribers 115. The connectorized ends of the pass-through fibers can be stored at the storage region 330 of the swing frame 230 when not in use. In other embodiments, however, a feeder cable 310 having a connectorized end can be routed directly to the termination region 340 of the swing frame 230.

Figure 8:
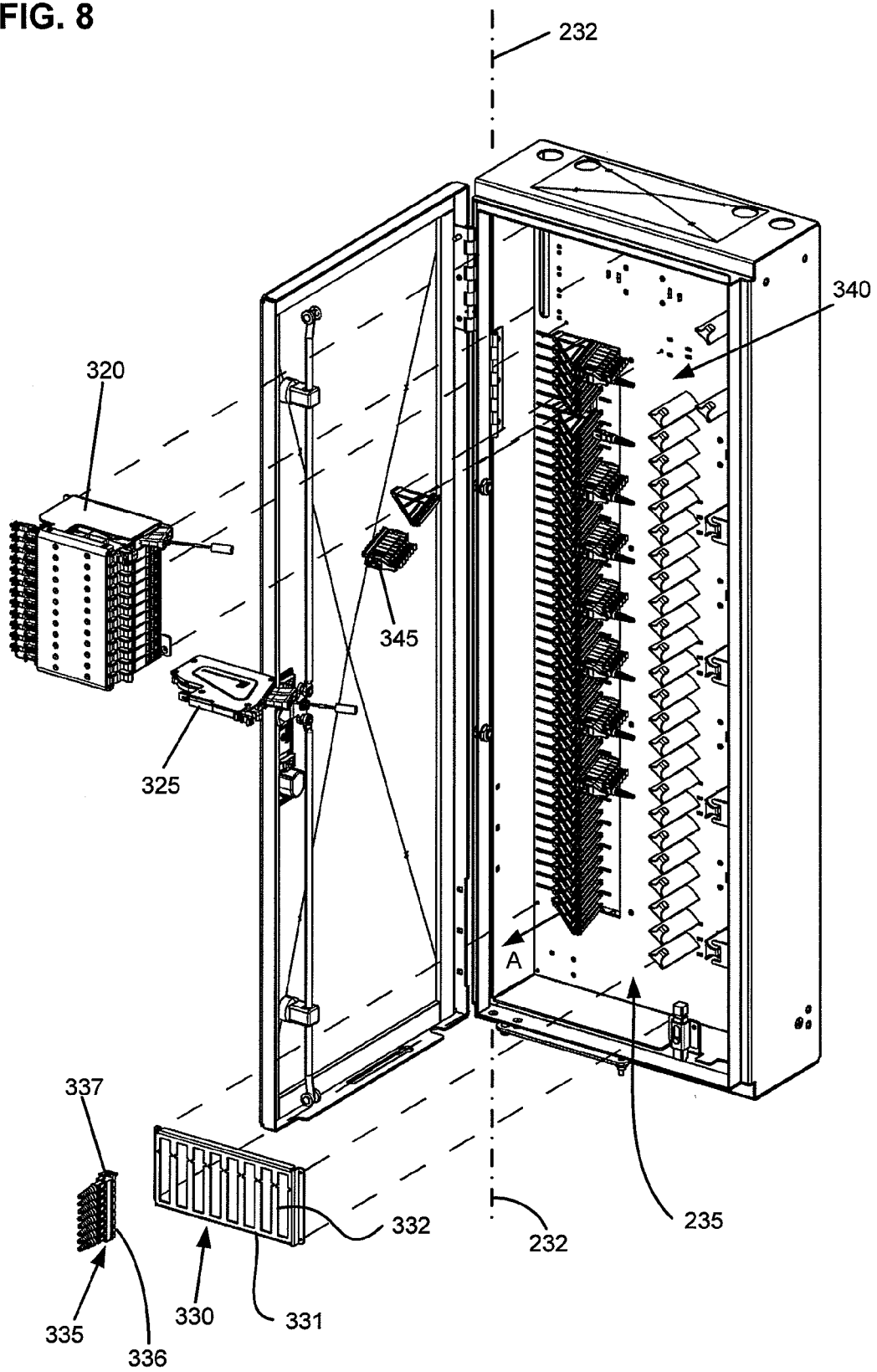
FIG. 8 is an isometric, partially exploded view of the example FDH of FIG. 6 with a splitter mounting location and a storage location exploded from the swing frame and with a splitter module exploded from the splitter mounting location, a termination module exploded from a termination location, and a storage module exploded from the storage location in accordance with the principles of the present disclosure.
Figure 9:
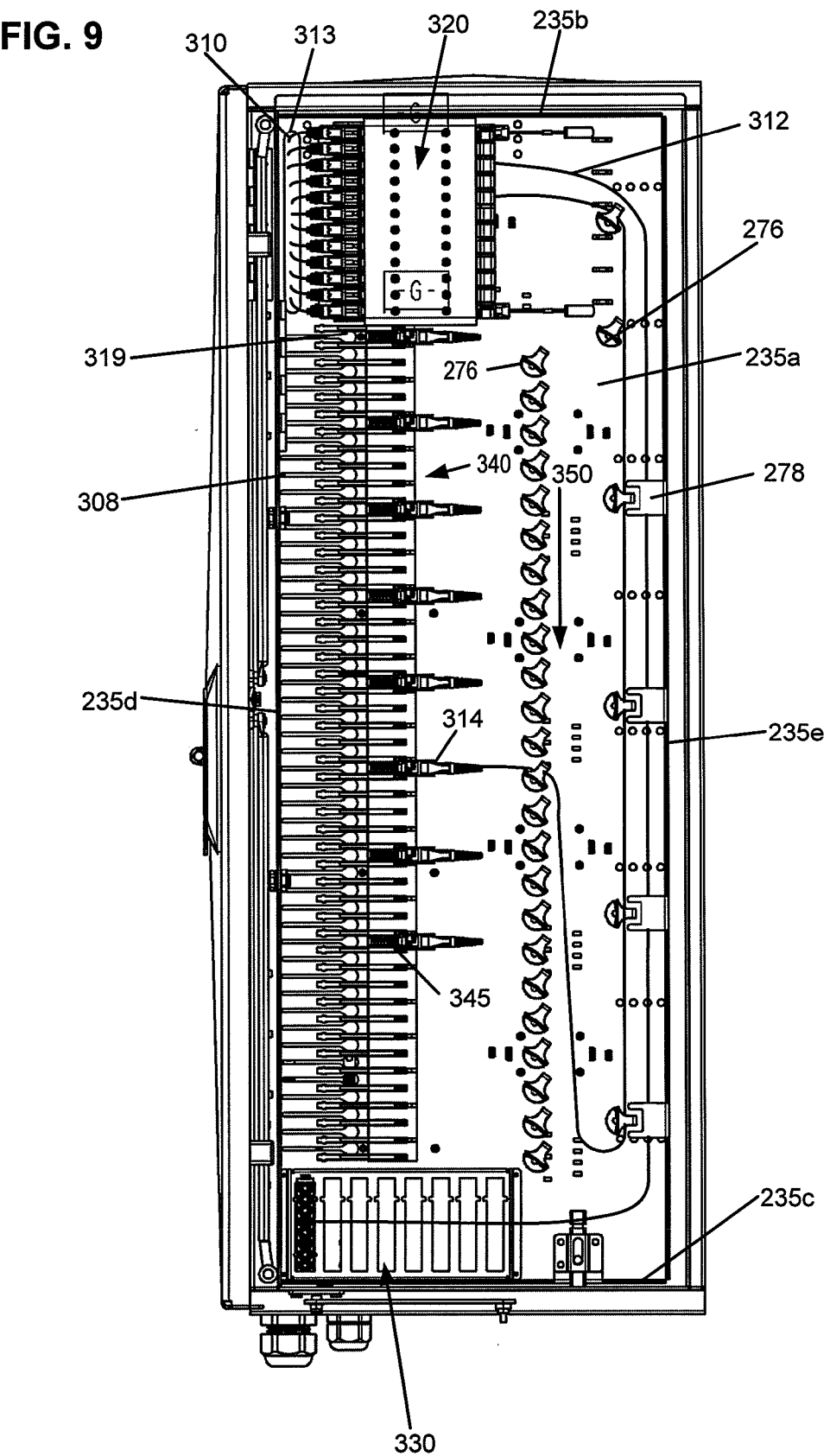
FIG. 9 is a front view of the FDH of FIG. 6 showing feeder fibers routed to splitter modules, a first splitter pigtail routed from one of the splitter modules to a storage module, and a second splitter pigtail routed from another of the splitter modules to a termination module in accordance with the principles of the present disclosure.

Referring to FIGS. 8-10, some embodiments of the swing frame 230 have a generally rectangular configuration having a height $H_2$ that corresponds generally to the height H of the enclosure 202 and a width $W_2$ that corresponds generally to the width W of the enclosure 202 (see FIG. 10). The swing frame 230 also has a depth $D_2$ (FIG. 10) that is smaller than the depth D of the enclosure 202 to accommodate cable management structures provided one the rear side 234 of the swing frame 230. The swing frame 230 has a rectangular rear wall 235a (FIG. 9). A top wall 235b, a bottom wall 235c, a first side wall 235d, and a second side wall 235e project forwardly from the rear wall 235a (FIGS. 8-10). The rear, top, bottom, and side walls of the swing frame 230 form a forwardly facing tray/recess 235 (FIG. 8) in which telecommunications equipment can be mounted.

Still referring to FIGS. 8-10, a number of telecommunications components are mounted within the tray defined by the front side 233 of the swing frame 230. For example, a splitter mounting location 320 for mounting fiber optic splitter modules 325 is located adjacent the top 235a of the swing frame 230. A termination field 340 is located beneath the splitter mounting location 320. A connector storage location 330 is positioned beneath the termination field 340. One or more vertical cable management channels 350 extend vertically along the side 235e at the front 233 of the swing frame 230. Cable management structures (e.g., fiber storage loops, fiber radii bend limiters, storage clips, etc.) are provided in the cable management channels 350.

Figure 11:
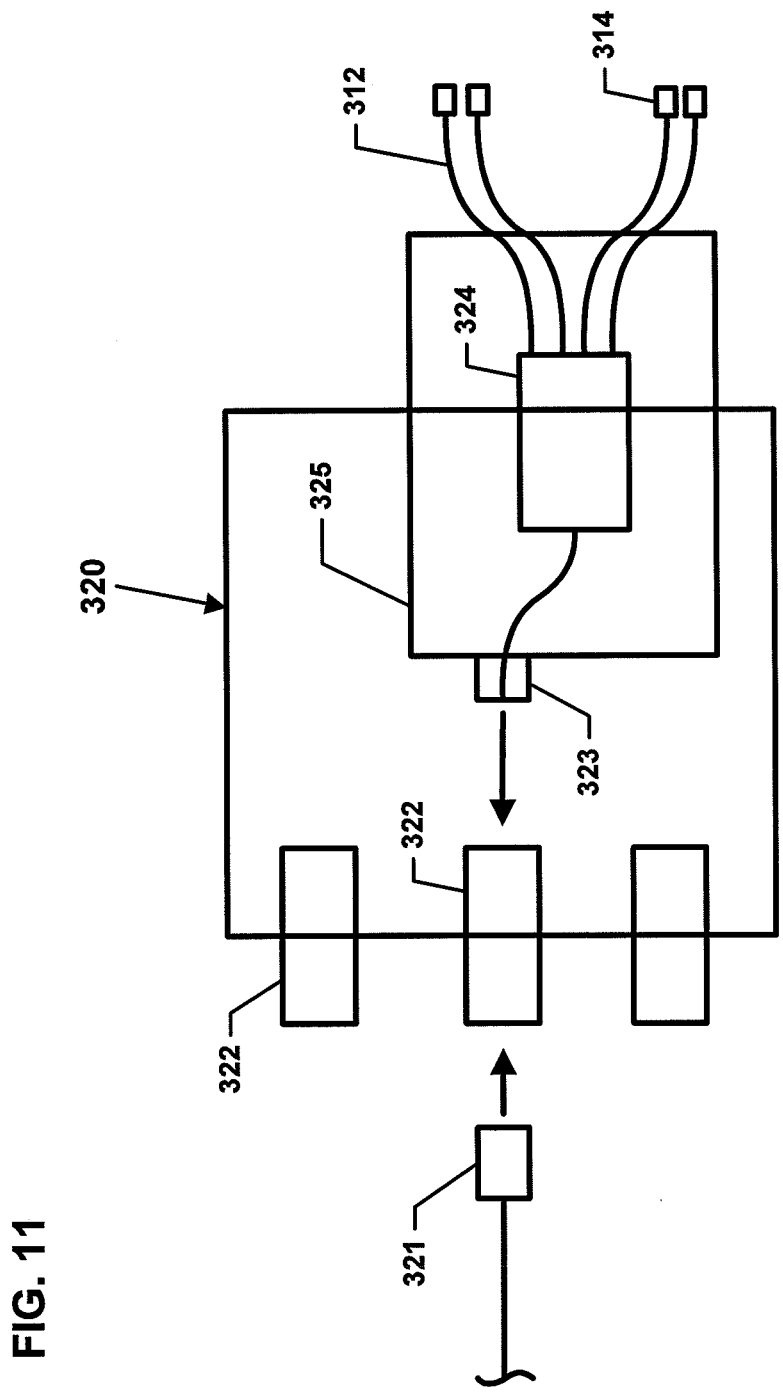
FIG. 11 is a schematic diagram of a splitter mounting location including multiple fiber optic adapters configured to receive input fibers at first ports and splitter input connectors at second ports to connect the input fibers to a splitter in order to split signals carried by the input fibers to multiple splitter pigtails in accordance with the principles of the present disclosure.

The splitter mounting location 320 has a plug-and-play configuration. In this configuration, the fiber optic splitter modules 325 containing fiber optic splitters 324 are inserted into the splitter mounting location 320 and optically connected to feeder fibers 310. A schematic diagram of one example splitter mounting location 320 is shown in FIG. 11. The splitter mounting location 320 includes one or more fiber optic adapters 322. A connectorized end of one of the feeder fibers 310 (i.e., or a splitter input fiber) plugs into a first end of one of the adapters 322. A fiber optic connector 323 mounted on a fiber optic splitter module 325 plugs into the second end of the adapter 322 to couple the feeder fiber 310 to a splitter 324 arranged within the fiber optic splitter module 325.

Within the splitter modules 325, the signals from the feeder fibers 310 are split at the splitter 324 and directed into a plurality (e.g., 8, 16, 32, etc.) of pigtails 312.

As shown in FIG. 9, the splitter pigtails 312 are routed laterally away from the splitter modules 325 and then downwardly along the vertical cable management channel 350. The ends of the pigtails 312 include fiber optic connectors 314. Some of the pigtails 312 are routed downwardly and then looped back upwardly and plugged into termination adapters 345 at the termination field 340 so as to be optically connected to another optical fiber (e.g., a fiber 318 corresponding to a subscriber 115). Other connectorized pigtails 312 can be routed downwardly along the vertical cable management channel 350 and stored at the connector storage location 330. Splitter modules 325 and plug and play arrangements similar to those shown herein are described in greater detail in commonly owned U.S. patent application Ser. No. 10/980,978, filed Nov. 3, 2004; Ser. No. 11/138,063, filed May 25, 2005; Ser. No. 11/138,889, filed May 25, 2005; and Ser. No. 11/354,297, filed Feb. 13, 2006, the entire disclosures of which are incorporated herein by reference.

The termination field 340 includes a plurality of adapter modules 345 that are disposed on the swing frame 230. Each adapter module 345 includes a horizontal row of fiber optic adapters (e.g., a row of 6 fiber optic adapters). Each of the fiber optic adapters includes a first port facing toward the second side wall 235e of the swing frame 230 for receiving a connector 314 terminating one of the splitter pigtails 312. Each of the fiber optic adapters also includes a second port facing toward the first side wall 235d of the swing frame 230 for receiving a fiber optic connector 316 corresponding to one of the fibers 318 routed from the FDH 200 to a remote location (e.g., to a subscriber location 115 of FIG. 1). As is known in the art, the fiber optic adapters are configured to providing an optical coupling between fiber optic connectors inserted into the ports.

The adapter modules 345 are moveable (e.g., slideable) between a retracted position and an extended position. The retractable/extendable configuration of the adapter modules 345 facilitates accessing the densely populated fiber optic adapters. Moving the adapter module 345 into the extended position provides enhanced access to the ports of the extended adapter module 345 and, accordingly, to the connectors 314, 316 plugged into the ports. Similar sliding adapter modules are described in greater detail in commonly owned U.S. Pat. Nos. 5,497,444; 5,717,810; 6,591,051; and in U.S. Patent Publication No. 2007/0025675, the disclosures of which are incorporated herein by reference.

The adapter modules 345 move (e.g., slide) along a slide axis $A_S$ (FIGS. 12 and 13) when moved from the retracted position to the extended position. For example, the adapter modules 345 can be oriented to slide in a forward-to-rearward direction (i.e., in a forward direction F and a rearward direction R). In one such embodiment, the adapter modules 345 slide away from and back toward the rear wall 235a of the swing frame 230 when moving between the retracted and extended positions. In another embodiment, the slide axis $A_S$ extends in a forward-to-rearward direction with respect to the back wall 204e of the enclosure 202.

Figure 12:
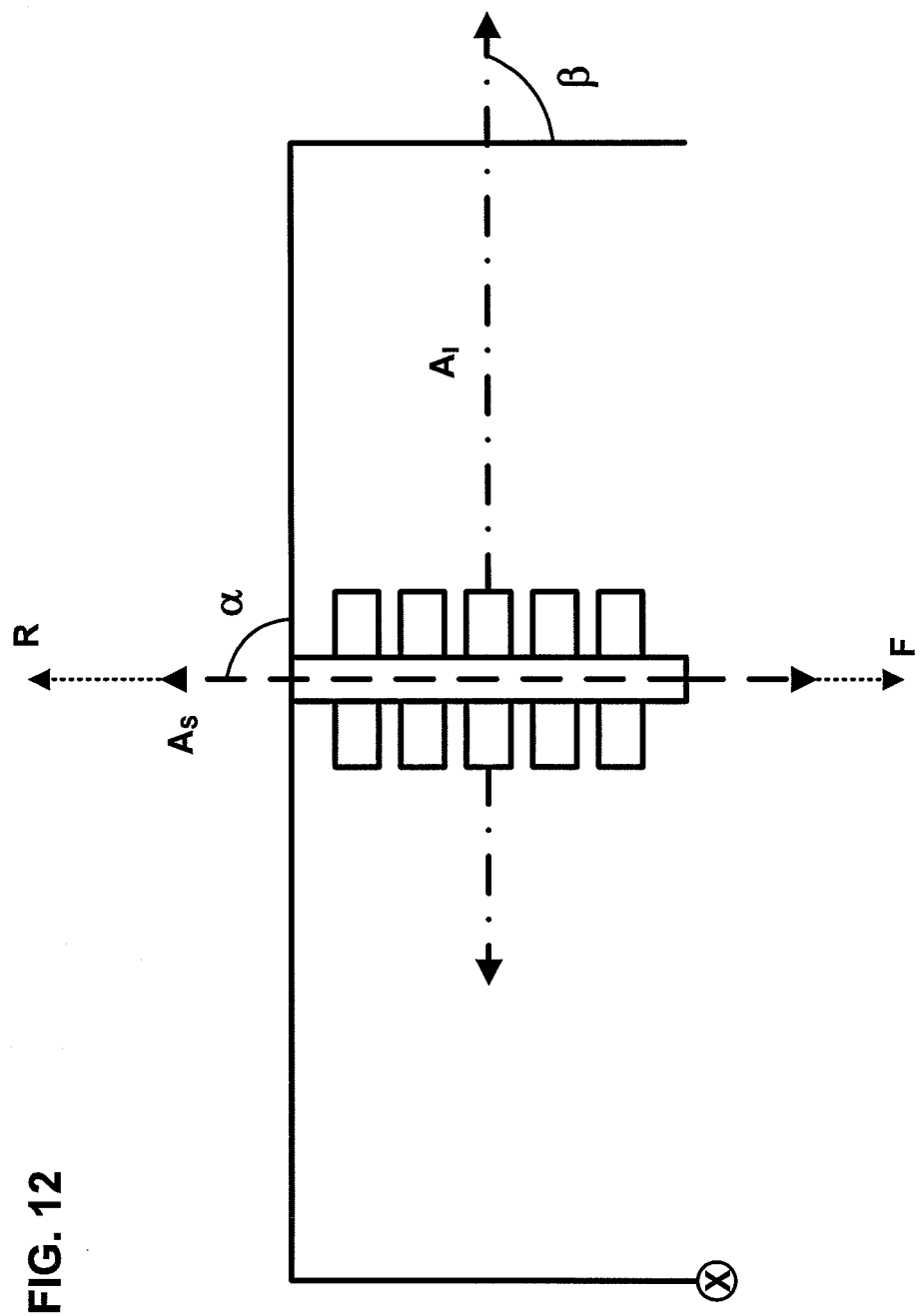
FIG. 12 is a schematic diagram of a top, plan view of a swing frame including a termination module having fiber a slide axis extending completely in a front-to-rear direction in accordance with the principles of the present disclosure.
Figure 13:
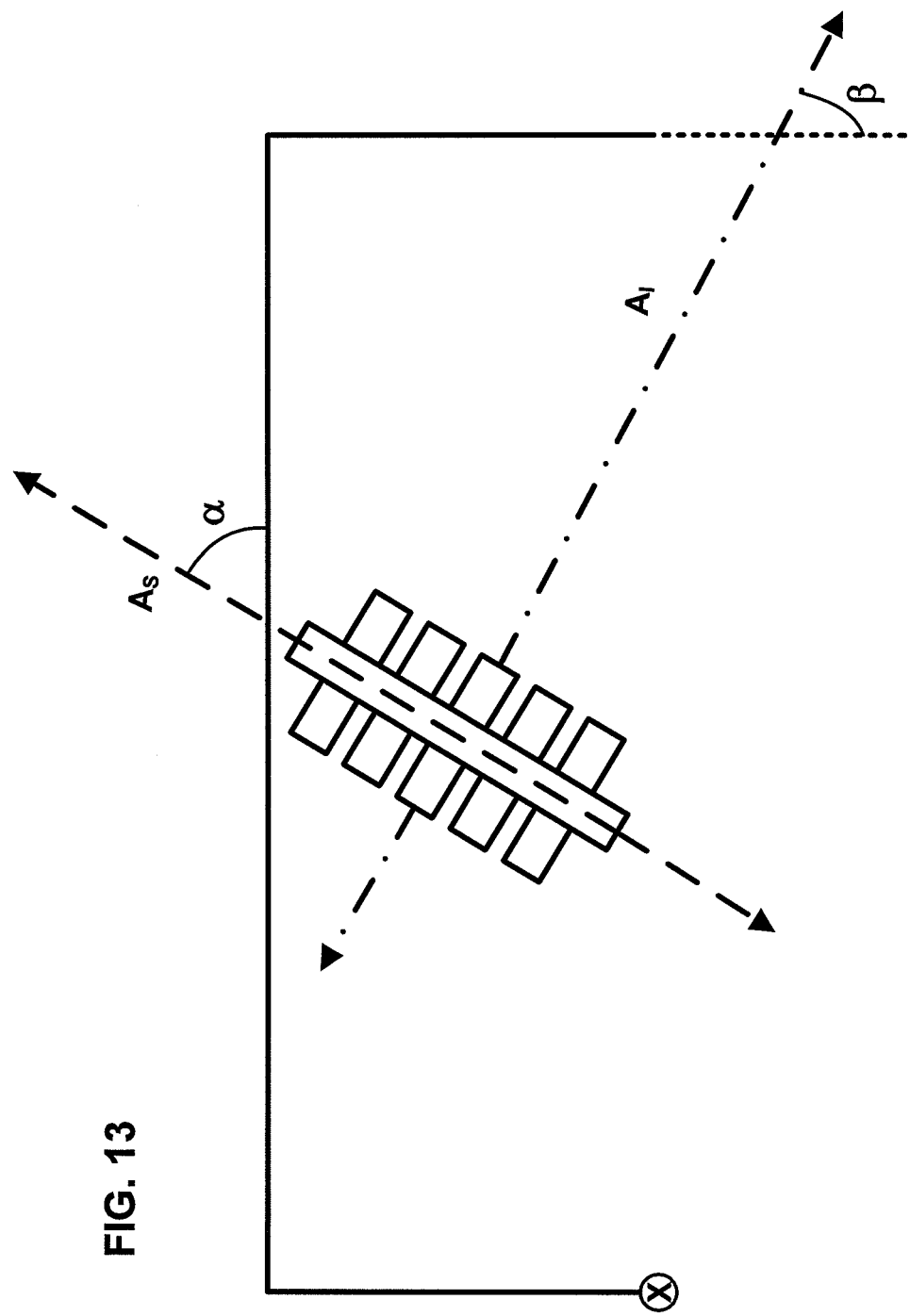
FIG. 13 is a schematic diagram of a top, plan view of a swing frame including a termination module having fiber a slide axis extending at least partially in a front-to-rear direction in accordance with the principles of the present disclosure.
Figure 14:
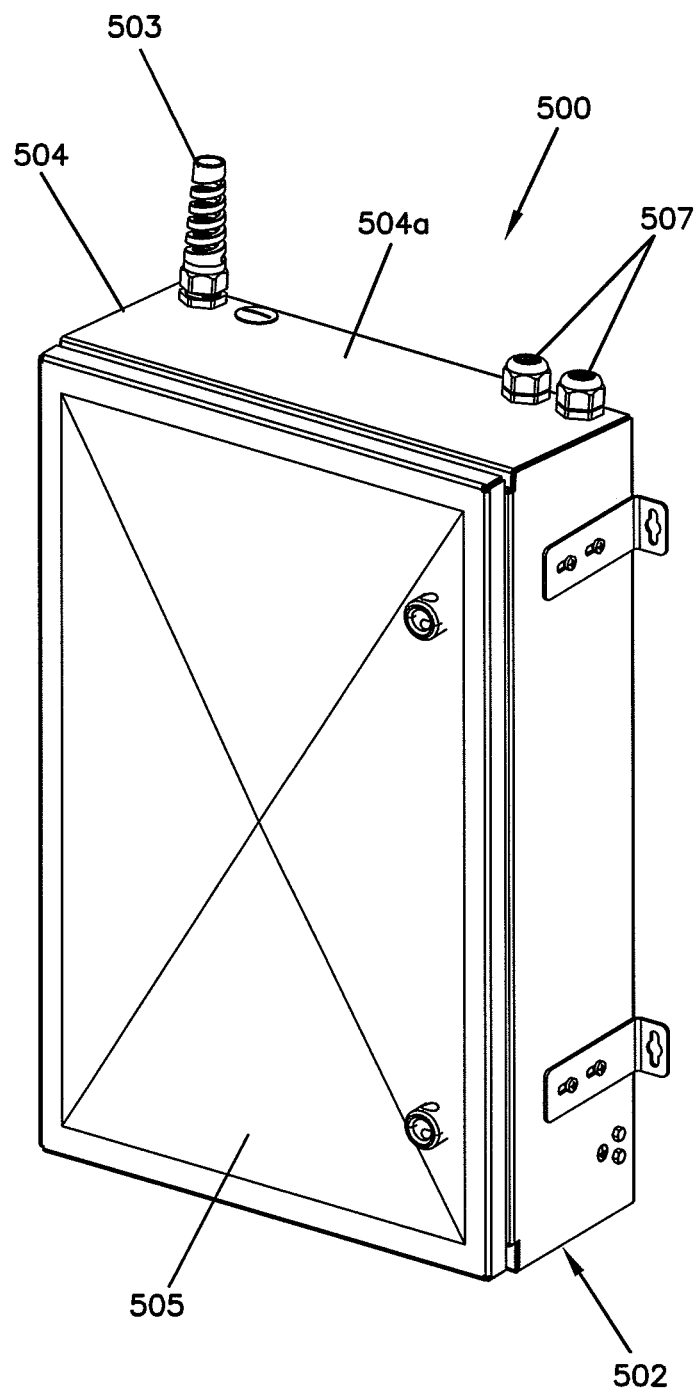
FIG. 14 is a front, top isometric view of another example FDH including a body and a door in accordance with the principles of the present disclosure.
Figure 15:
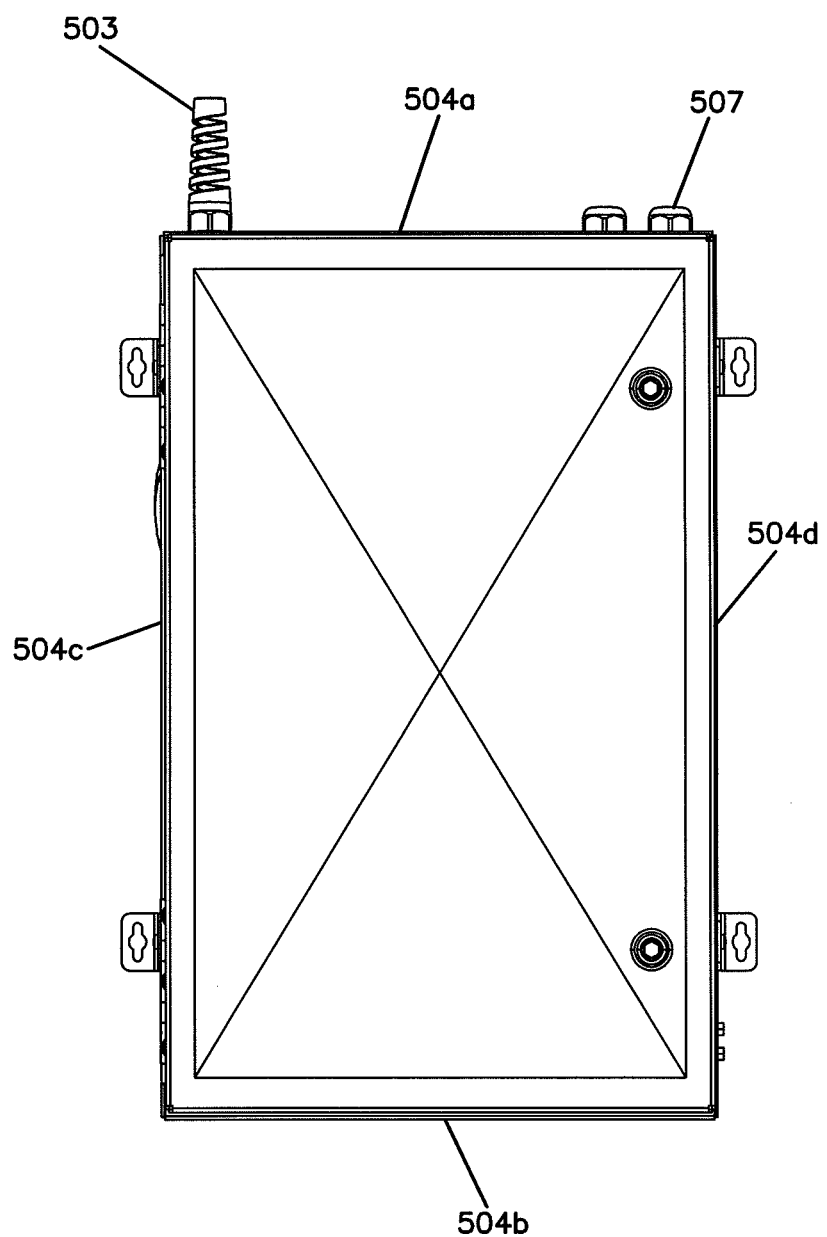
FIG. 15 is a front view of the example FDH of FIG. 14 in accordance with the principles of the present disclosure.
Figure 16:
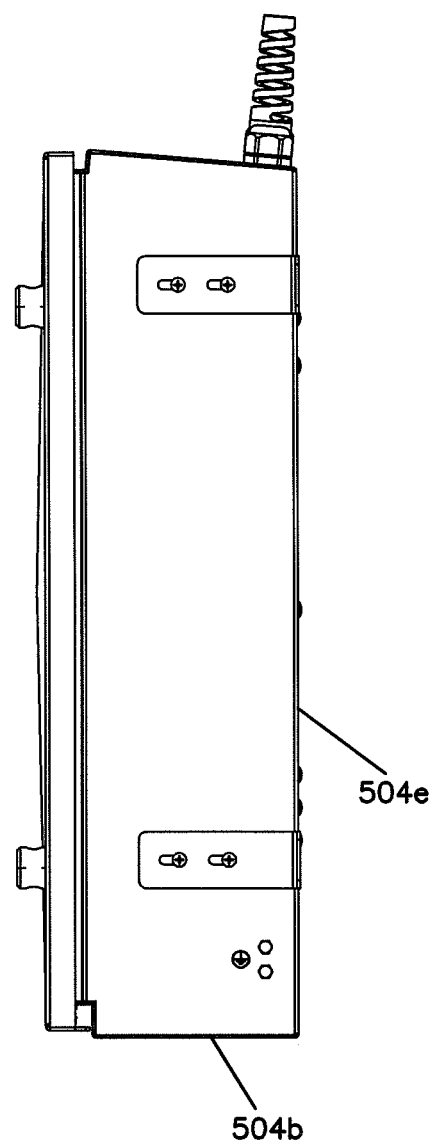
FIG. 16 is a side elevational view of the example FDH of FIG. 14 in accordance with the principles of the present disclosure.
Figure 17:
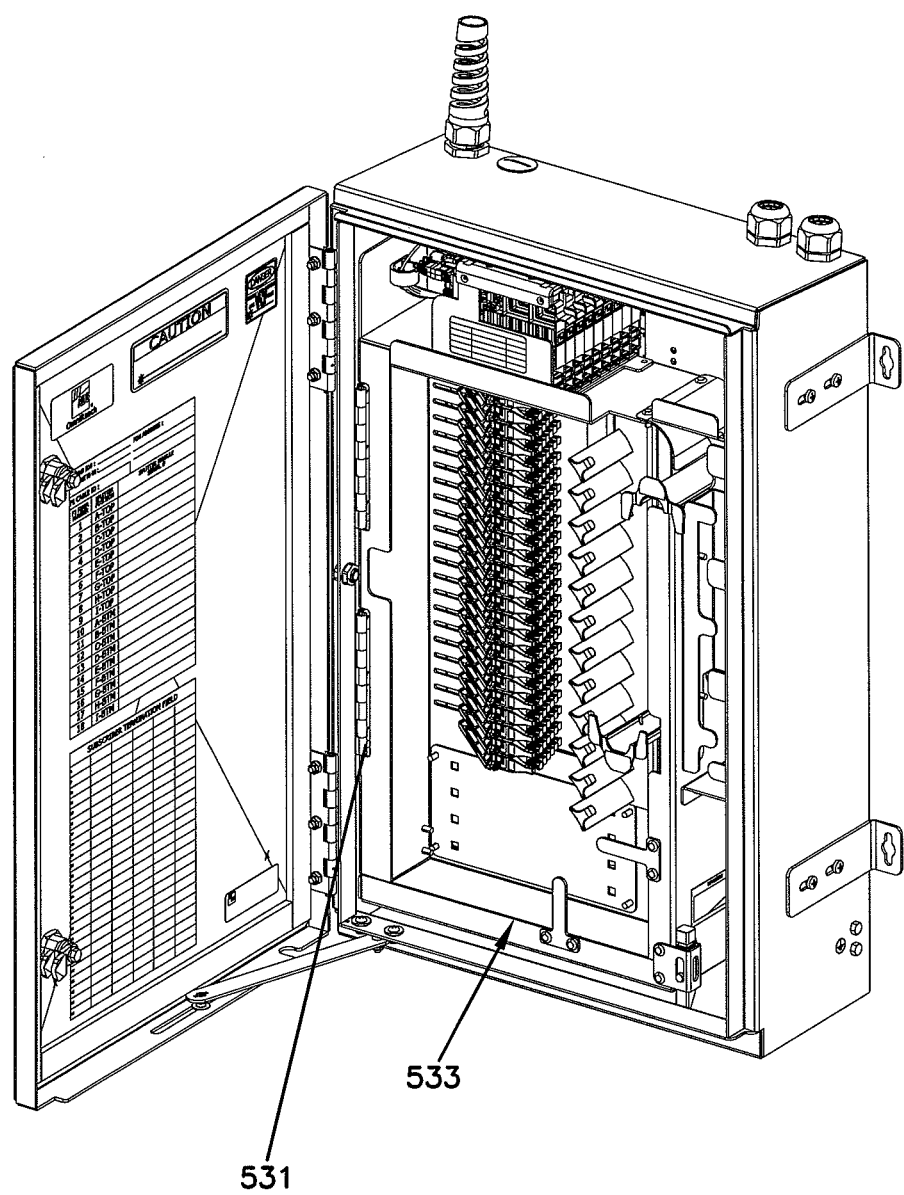
FIG. 17 is a front, top isometric view of the example FDH of FIG. 14 with the door opened and a swing frame contained within an interior of the body of the FDH in accordance with the principles of the present disclosure.
Figure 18:
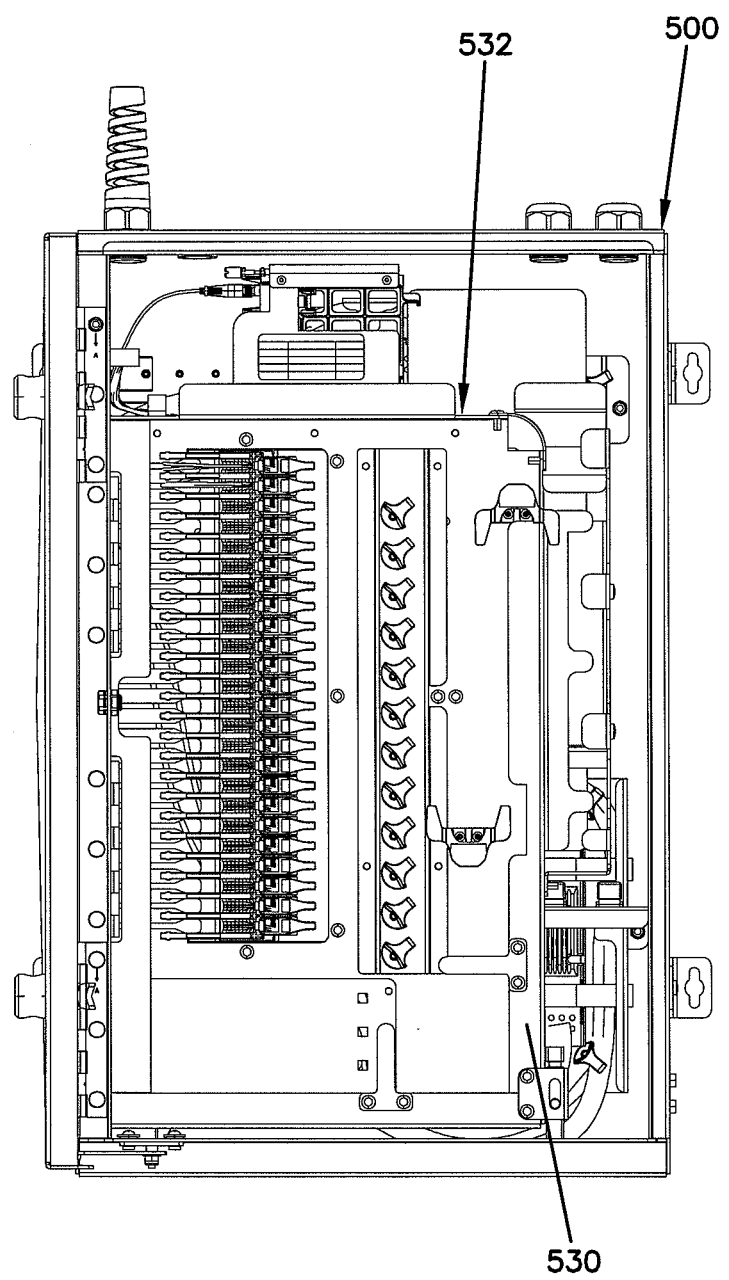
FIG. 18 is a front view of the example FDH of FIG. 17 in accordance with the principles of the present disclosure.

The adapter modules 345 can be oriented such that the slide axis $A_S$ extends at an angle α with respect to the enclosure 202 and/or the swing frame 230. In general, the slide axis $A_S$ extends at least partially in a forward-to-rearward direction. As the term is used herein, an axis that extends "at least partially in a forward-to-rearward direction" extends at an angle α that is greater than zero and less than ninety degrees with respect to the enclosure 202 or the swing frame 230. In some example embodiments, the slide axis $A_S$ extends mainly in a forward-to-rearward direction as shown in FIG. 13. As the term is used herein, an axis that extends "mainly in a forward-to-rearward direction" extends at an angle α that is greater than forty-five degrees and less than ninety degrees. In other example embodiments, the slide axis $A_S$ extends completely in a forward-to-rearward direction as shown in FIG. 12. As the term is used herein, an axis that extends "completely in a forward-to-rearward direction" extends at an angle α of about ninety degrees (plus or minus a reasonable tolerance).

In one embodiment, the sliding axis $A_S$ extends generally horizontally with respect to the bottom wall 204b of the enclosure 202 and/or the bottom wall 235c of the swing frame 230. In another embodiment, the sliding axis $A_S$ extends at an upward or downward angle with respect to the bottom wall 204b of the enclosure 202 and/or the bottom wall 235c of the swing frame 230.

Fiber optic adapters of the adapter modules 345 having ports defining insertion axes along which fiber optic connectors 314, 316 can be plugged into the fiber optic adapters. The ports face laterally outwardly toward the sides 235d, 235e of the swing frame 230. The fiber optic connectors 314, 316 extend laterally outwardly from the ports of the adapter modules 345 along the insertion axes (see example insertion axis $A_I$ of FIGS. 12 and 13). The width $W_2$ of the swing frame 230 is sufficiently wide to accommodate the minimum bend radius of the splitter pigtails 312 and the subscriber cables 318 as these cables extend outwardly from the connectors 314, 316. Due to the orientation of the adapter modules 345, the depth D2 of the swing frame 230 and, accordingly, the depth D of the enclosure body 204 need not be sufficiently deep to accommodate such a minimum bend radius limit.

In general, the insertion axis $A_I$ extends and the ports face at least partially in a lateral direction. As the term is used herein, an axis that extends "at least partially in a lateral direction" extends at an angle β that is greater than zero and less than ninety degrees with respect to the side walls 235d, 235e of the swing frame 230. In some embodiments, the insertion axis $A_I$ extends mainly in a lateral direction. As the term is used herein, an axis that extends "mainly in a lateral direction" extends at an angle β that is greater than forty-five degrees and less than ninety degrees with respect to the sides 235d, 235e of the swing frame 230. In other embodiments, the insertion axis $A_I$ extends completely in a lateral direction. As the term is used herein, an axis that extends "completely in a lateral direction" extends at an angle β of about ninety degrees (plus or minus a reasonable tolerance) with respect to the sides 235d, 235e of the swing frame 230.

The connector storage location 330 includes a panel 331 defining one or more openings 332 at which panel-mounted connector storage blocks 335 can be mounted. Each connector storage block 335 includes a snap-fit connection mechanism 337 to secure the connector storage block 335 to one of the panel openings 332. The connector storage blocks 335 are adapted for storing and protecting the connectorized ends 314 of the splitter pigtails 312 when the splitter pigtails 312 are not connected to the termination field 340. In one embodiment, the connector storage blocks 335 are configured to receive the connectorized ends 314 when dust caps are mounted over ferrules of the connectorized ends 314. In another embodiment, each of the connector storage blocks 335 includes an integral (one-piece) housing 336 defining openings leading to an interior in which the connectorized ends 314 can be stored. In another embodiment, the housing 336 is made from plastic. Further details regarding example embodiments of the connector storage blocks 345 can be found in U.S. Pat. Nos. 7,277,620 and 7,198,409, which are hereby incorporated by reference.

Referring to FIG. 10, a jacketed feeder cable 310 having feeder fibers 313 is routed into the enclosure 202 through the bottom wall 204b of the enclosure 202. In some embodiments, the feeder cable 310 includes a stub cable having fiber ends located outside the enclosure 202 that are spliced or otherwise connected to another length of feeder cable that extends to a location, such as a central office. In one embodiment, the stub cable is installed in the enclosure 202 prior to installation of the enclosure 202. The fiber ends of the stub cable are spliced to the other length of feeder cable during installation of the enclosure 202.

A clamp 291 can be used to secure the jacketed feeder cable 310 to the back wall 204e of the enclosure 202. Once inside the enclosure 202, the feeder fibers 313 of the jacketed feeder cable 310 are upjacketed in a buffer tube and routed upwardly along the hinge axis 232 of the swing frame 230 to the top, back side of the swing frame 230. At the top, back side of the swing frame 230, the fibers 313 are fanned out by a fan out module 311 to which the buffer tube is secured. The fanned out fibers 313 can be routed about a storage spool 372 to store excess fiber. After routing around the storage spool 372, the feeder fibers 313 are routed through a vertical slot 236 that extends through the back wall 232a of the swing frame 230. Once passing through the vertical slot 236, the fibers 313 are routed to the splitter mounting location 320 where the fibers 313 are optically connected to a corresponding plug and play splitter modules 325 located at the splitter mounting location 320.

Referring still to FIG. 10, a jacketed distribution cable 318 also enters the enclosure 202 through the bottom wall 204b of the enclosure 202. In some embodiments, the jacketed distribution cable 318 includes a stub cable having fiber ends located outside the enclosure 202 that are spliced or otherwise connected to another length of distribution cable that extends to subscriber locations. In one embodiment, the stub cable is installed in the enclosure 202 prior to installation of the enclosure 202. The fiber ends of the stub cable are spliced to the other length of distribution cable during installation of the enclosure 202.

Upon entering the enclosure 202, the jacketed distribution cable 318 is preferably clamped to the back wall 204e of the enclosure 202 with a cable clamp 292. Subscriber fibers 319 located within the distribution cable 318 are upjacketed in buffer tubes which are routed upwardly along the hinge axis 232 of the swing frame 230 and along the rear wall 202e of the enclosure 202 behind the rear wall 232a of the swing frame 230. For example, the fibers 318 are shown extending across the back side 234 of the swing frame 230 (i.e., in a direction away from the hinge axis 232) and then downwardly along the back side 234 of the swing frame 230.

The upjacketed subscriber fibers 319 are routed to fan-out modules 317. At the fan-out modules 317, the fibers 319 are fanned out. The fanned out fibers 319 can be looped around fiber storage spools 274 mounted to the back side 234 of the swing frame 230 to store excess fiber. From the storage spools 274, the subscriber fibers 319 are routed laterally across the back side 234 of the swing frame 230 and through slots 308 defined through the back wall 235a of the swing frame 230 at a location proximate the hinge axis 232 of the swing frame 230. In one embodiment, the slots 308 extend generally horizontally through the back wall 235a of the swing frame 230 and can include enlarged portions sized for allowing a fiber optic connector (e.g., an SC connector) to pass through the slots 308. In certain embodiments, a plurality of the slots 308 or portions of a plurality of the slots 308 can be defined through a removable panel portion that forms at least a portion of the back wall of the swing frame. During installation, the panel portion can be removed to facilitate routing fibers from the back to the front of the swing frame and to facilitate positioning the fibers in the slots 308.

After passing through the horizontal slots 308, the subscriber fibers 319, which have been pre-terminated with fiber optic connectors 316, are routed to the termination field 340 and are plugged into the second ports of the fiber optic adapters of the adapter modules 345. In this way, when the connectorized pigtails 312 are plugged into the first ports of the fiber optic adapters, the pigtails 312 are optically connected to corresponding subscriber fibers 318 plugged into the second ports of the fiber optic adapters.

While the cables 310 and 318 have been shown entering the enclosure 202 from the bottom, in other embodiments, these cables can enter from the top or from any other side of the enclosure 202. In certain embodiments, the feeder cable 310 and distribution cable 318 can be terminated at fiber optic connectors, which can be plugged directly into the adapter modules 345 without any intermediate fibers or splitters. Also, the fiber distribution hub 200 can be provide with numerous cable management structures, such as fiber bend radius limiters 276, channel brackets 278, cable tie downs 279, and other structures.

FIGS. 14-21 show other embodiments of fiber distribution hubs 500, 500' and 500". The fiber distribution hubs each have a generally rectangular, low profile enclosure 502 (see FIGS. 14-16). The enclosure 502 has a generally rectangular main body 504 having a top wall 504a (FIG. 14), a bottom wall 504b (FIG. 16), a first side wall 504c (FIG. 15), a second side wall 504d (FIG. 15), and a back wall 504e (FIG. 16) defining an interior. The body 504 also defines a generally open front side 504f (FIG. 19) opposite the back wall 504e defining an access opening. The enclosure 502 also includes a door 505 typically mounted at the open front side 504f of the main body 504. The door 505 is pivotally movable from an open position (see FIG. 17) in which the interior of the enclosure 502 can be accessed to a closed position (see FIGS. 14-16) in which the door 505 at least partially covers the open front side 504f of the main body 504. A seal can be provided at the interface between the door 505 and the main body 504 for sealing the enclosure 502 when the door 505 is closed.

The enclosure 502 defines at least a first entrance port 503 through which a feeder cable can enter the body 504 and at least a first exit port 507 through which a subscriber distribution cable can exit the body 504. In some embodiments, the enclosure 502 can define additional entrance and/or exit ports. In the example shown, the first entrance port 503 and two exit ports 507 extend through the top panel 502a of the enclosure body 504. In other embodiments, however, the entrance port 503 and exit port 507 can be defined in any of the walls 502a-502e of the body 504. In one embodiment, one or more of the ports 503, 507 include strain relief members extending outwardly from the body 504.

In general, the enclosure 502 can include one or more telecommunications components including telecommunications circuits (e.g., optical outputs to subscribers). For example, the enclosure 502 shown in FIGS. 14-21 is configured to hold approximately 144 telecommunications circuits. Other embodiments can be configured to hold greater or fewer circuits. Typically, the enclosure 502 has a depth of less than about 9 inches. In some embodiments, the enclosure 502 has a depth of less than about 8 inches. Indeed, in some embodiments, the enclosure 502 has a depth of less than about 7 inches.

The enclosure body 504 contains cable interface components that facilitate optically coupling together incoming feeder cable(s) and outgoing distribution cable(s). In general, the body 504 contains at least a first feeder cable interface 542 and at least a first distribution cable interface 544 (see FIGS. 20 and 21). In the examples shown in FIGS. 20 and 21, the first feeder cable interface 542 includes a splice tray 543. In other embodiments, however, the first feeder cable interface 542 can include one or more adapter modules for coupling connectorized ends of the feeder cable to the intermediate fibers.

Figure 20:
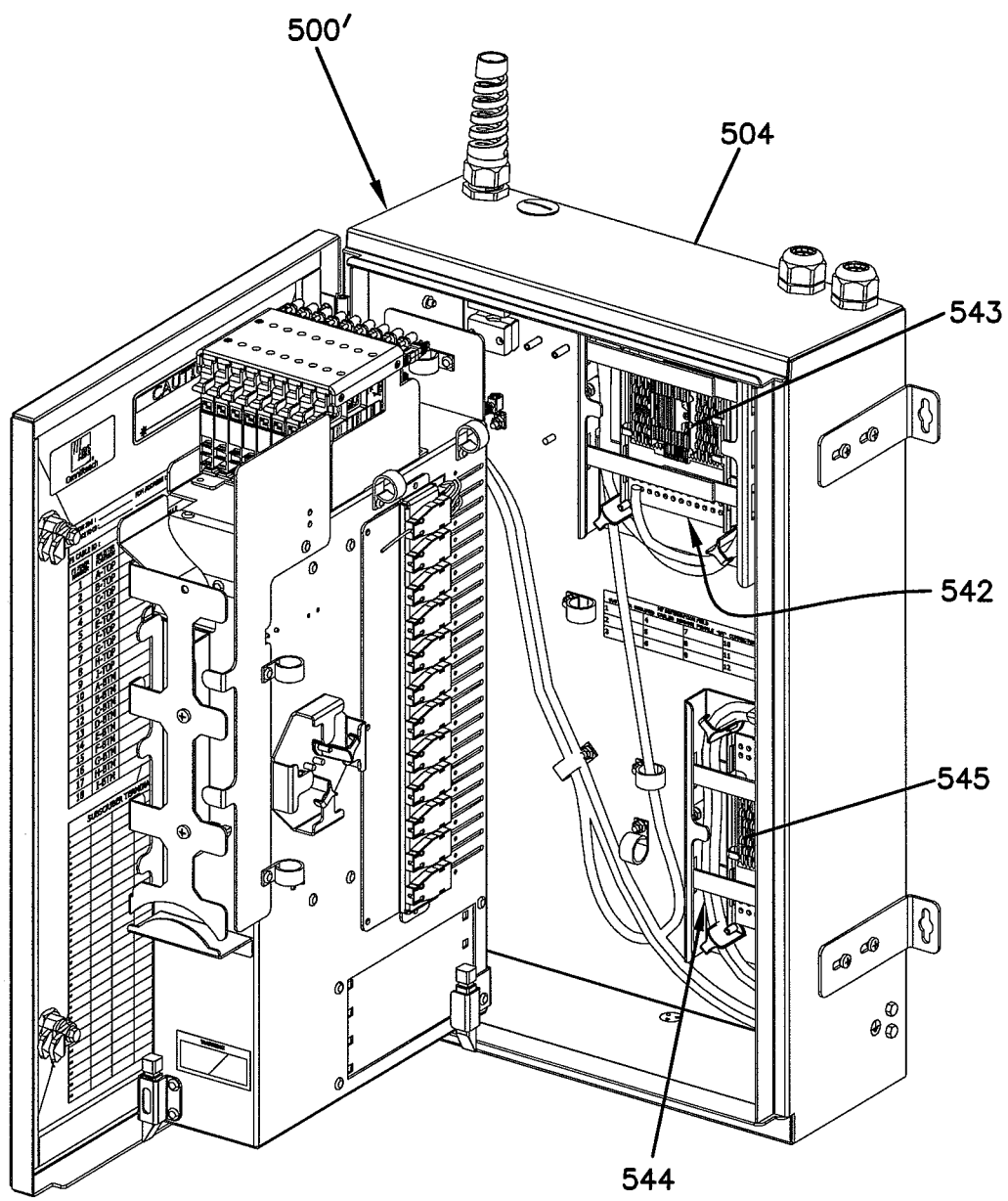
FIG. 20 is a front, top isometric view of the example FDH of FIG. 19 having a splice tray-type subscriber distribution cable interface in accordance with the principles of the present disclosure.
Figure 21:
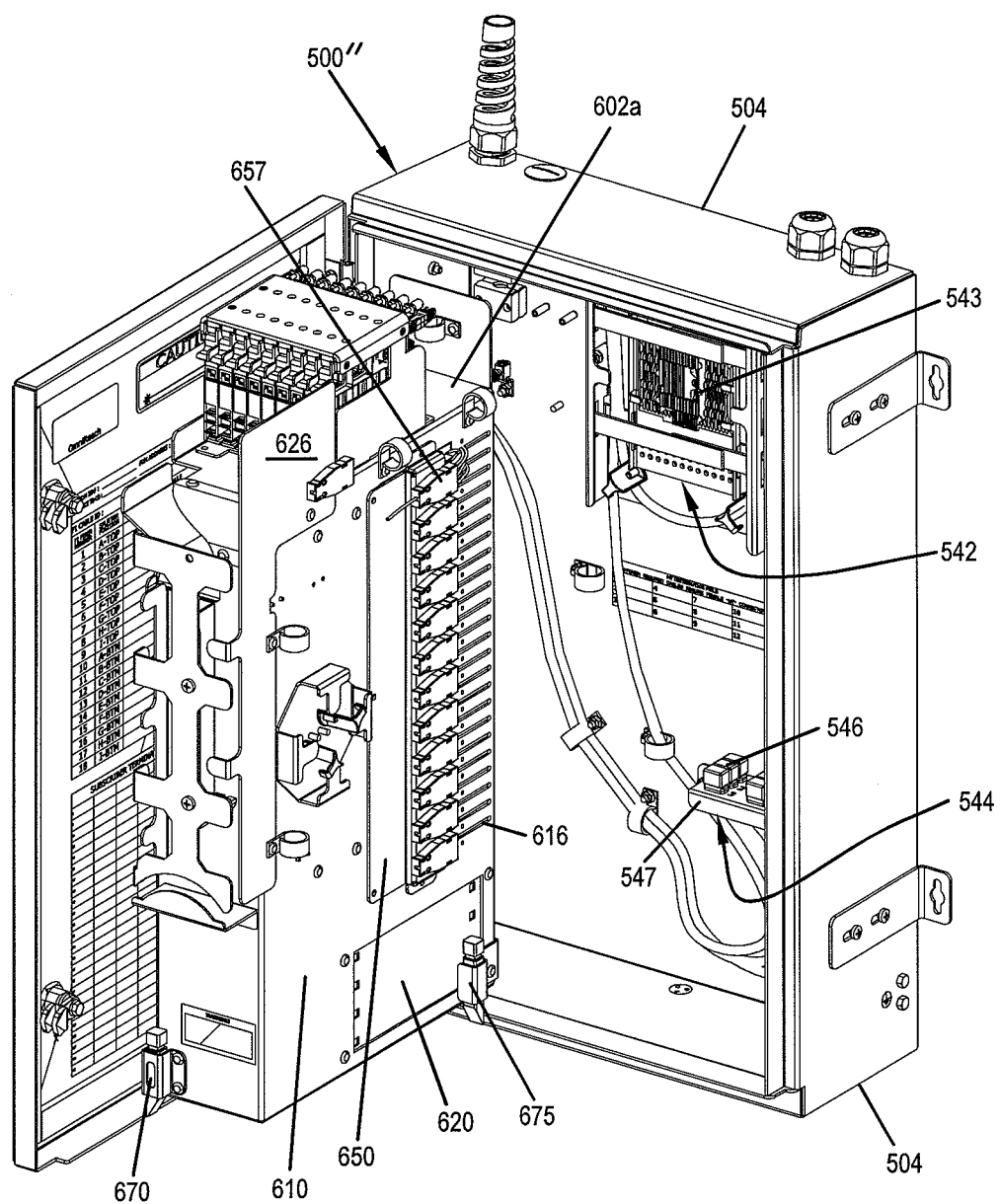
FIG. 21 is a front, top isometric view of the example FDH of FIG. 19 having multi-termination connector-type subscriber distribution cable interface in accordance with the principles of the present disclosure.

In the example fiber distribution hub 500' shown in FIG. 20, the first distribution cable interface 544 includes a splice tray 545. In some embodiments, the enclosure 502 can include multiple splice trays at which distribution cables can connect to intermediate fibers. In other embodiments, however, the first distribution cable interface 544 can include another type of interface. For example, the first distribution cable interface 544 can include one or more adapters for optically coupling connectorized ends of intermediate fibers and one or more distribution cables. In the example fiber distribution hub 500" shown in FIG. 21, the first distribution cable interface 544 includes a panel or shelf 547 at which one or more adapters 546 configured to receive multi-termination (MT) connectors can be installed. In another embodiment, adapters for single-termination connectors can be installed at the shelf 547. In still other embodiments, the enclosure 502 can include multiple distribution cable interfaces 544 of various types (e.g., splice trays and adapters).

Figure 19:
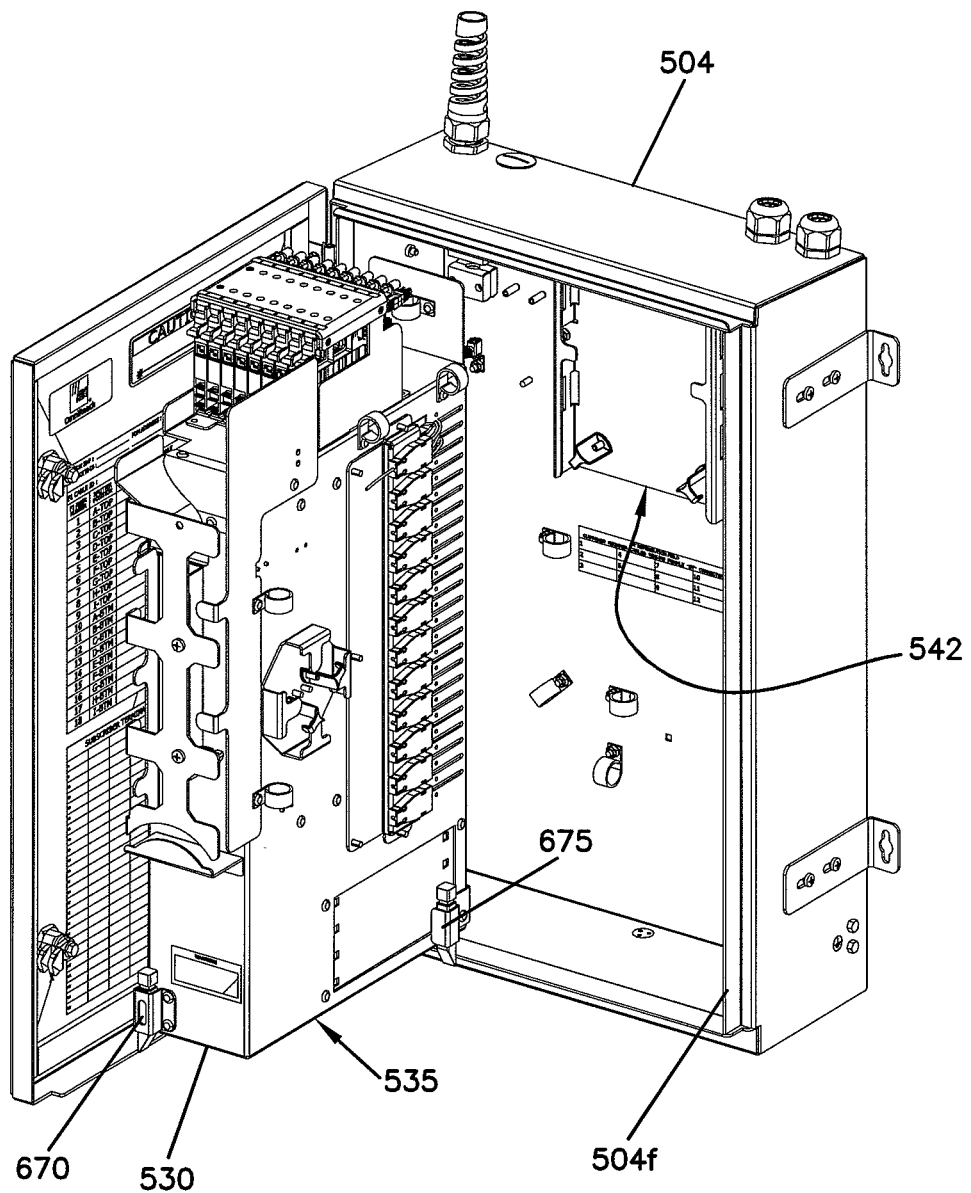
FIG. 19 is a front, top isometric view of the example FDH of FIG. 17 with the swing frame pivoted through an access opening defined in a front of the body of the FDH in accordance with the principles of the present disclosure.

The fiber distribution hub 500 includes a swing frame 530 pivotally mounted within the enclosure 502 (see FIG. 19). The swing frame 530 has a front side 533 (FIG. 17) and a rear side 535 (FIG. 19). In one embodiment, the swing frame 530 is connected to the enclosure 502 by a hinge arrangement 531 (FIG. 17) defining a vertical hinge axis located adjacent a front corner of the main body 504 of the low profile enclosure 502. The swing frame 530 is configured to be moved between a first position (see FIG. 17) in which the swing frame 530 is arranged completely within the main body 504 of the enclosure 502 and a second position (see FIG. 19) in which the swing frame 530 is pivoted through the open front side 504f of the main body 504 such that the rear side 535 of the swing frame 530 is accessible.

The swing frame 500 can include one or more locking assemblies for locking the swing frame 500 into one or more positions. For example, the swing frame 530 shown in FIG. 19 includes a first locking assembly 670 mounted at a front of a side panel and a second locking assembly 675 mounted at a rear side 535 of the swing frame 530. Locking assembly 670 engages a catch provided at the bottom of the enclosure 502 to retain the swing frame in the first position. The locking assembly 675 engages a front edge of the enclosure 502 to retain the swing frame in the second position. Other swing frame embodiments can have greater or fewer locking assemblies.

Figure 22:
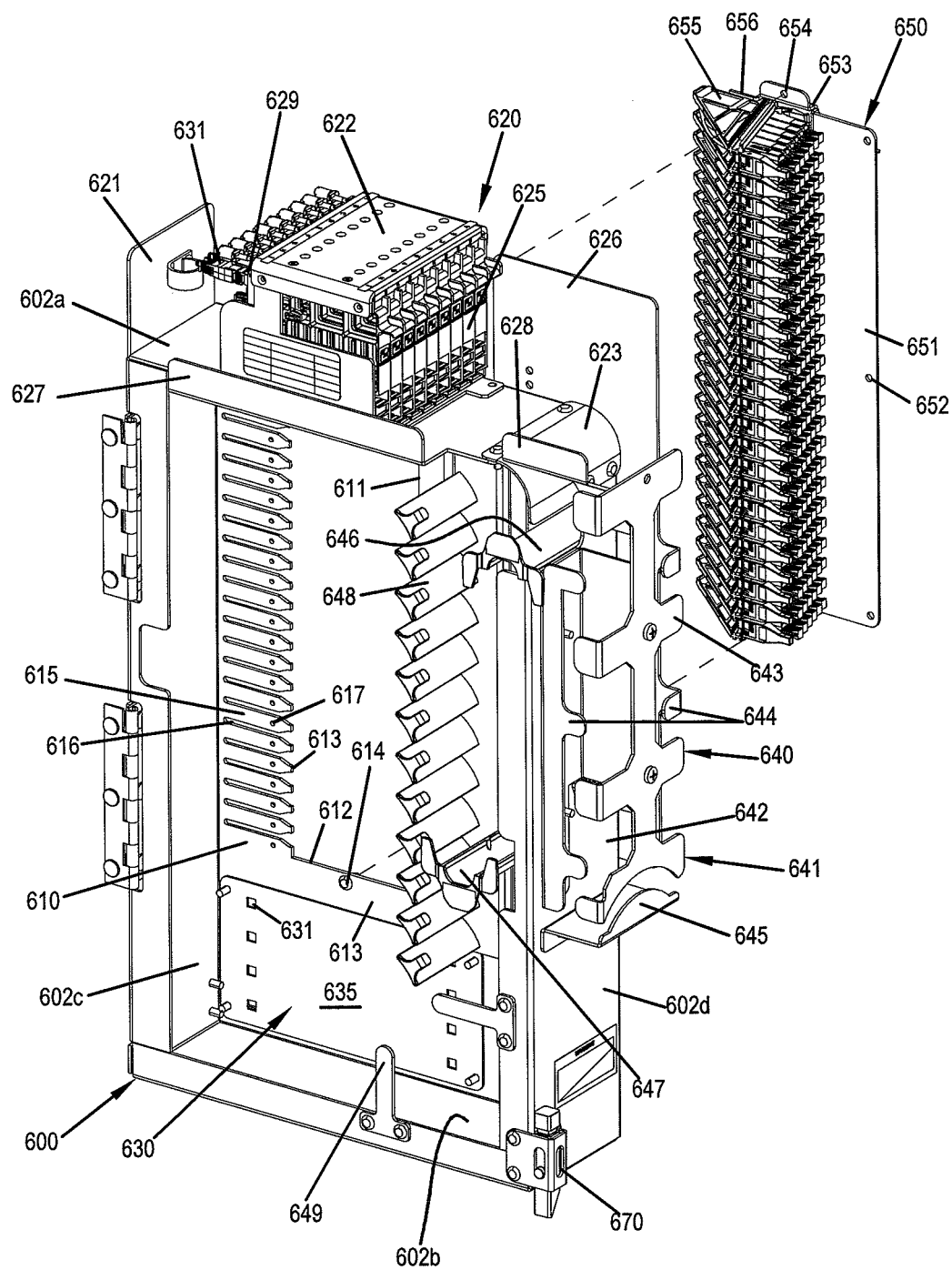
FIG. 22 is a front, top isometric view of one example swing frame configured to mount within an FDH in accordance with the principles of the present disclosure.
Figure 23:
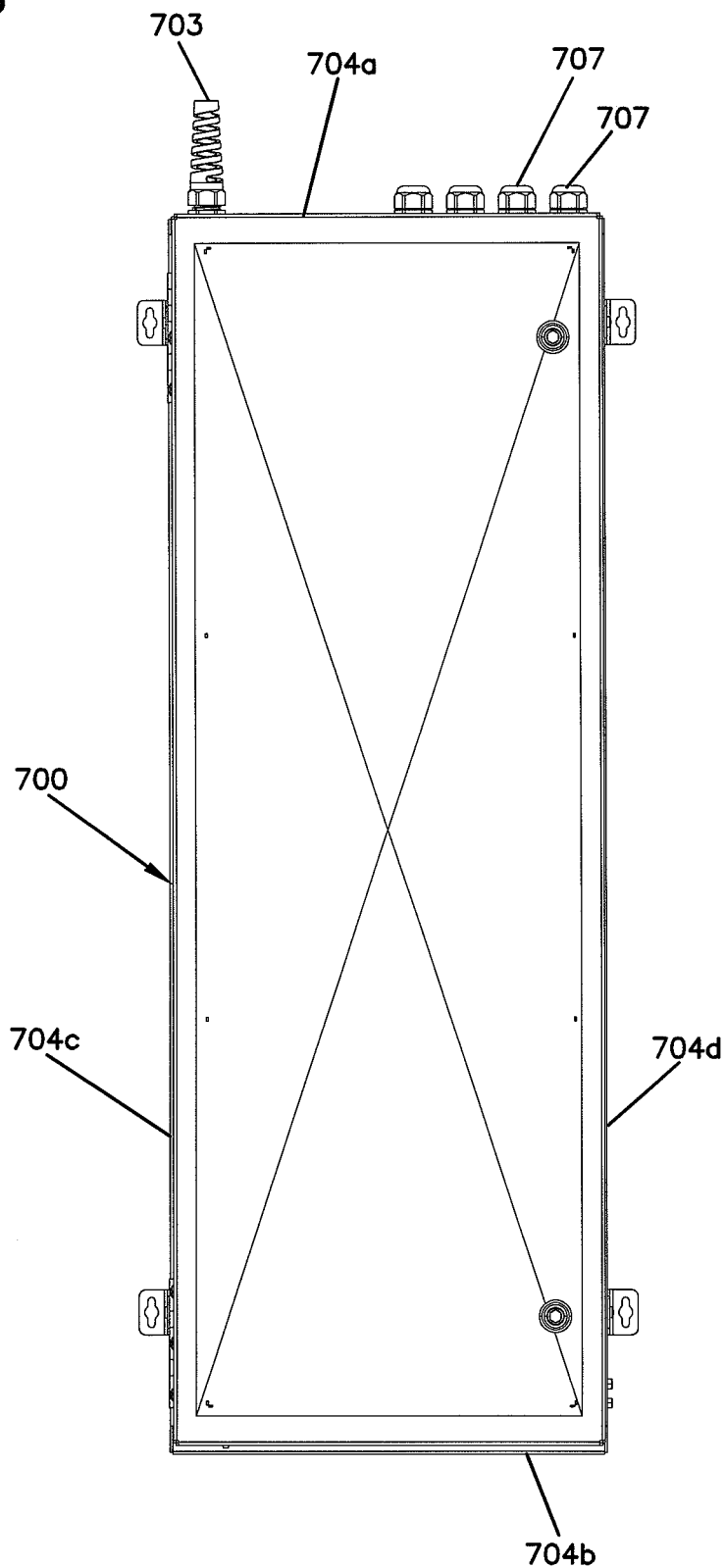
FIG. 23 is a front, top isometric view of another example FDH including a body and a door in accordance with the principles of the present disclosure.
Figure 24:
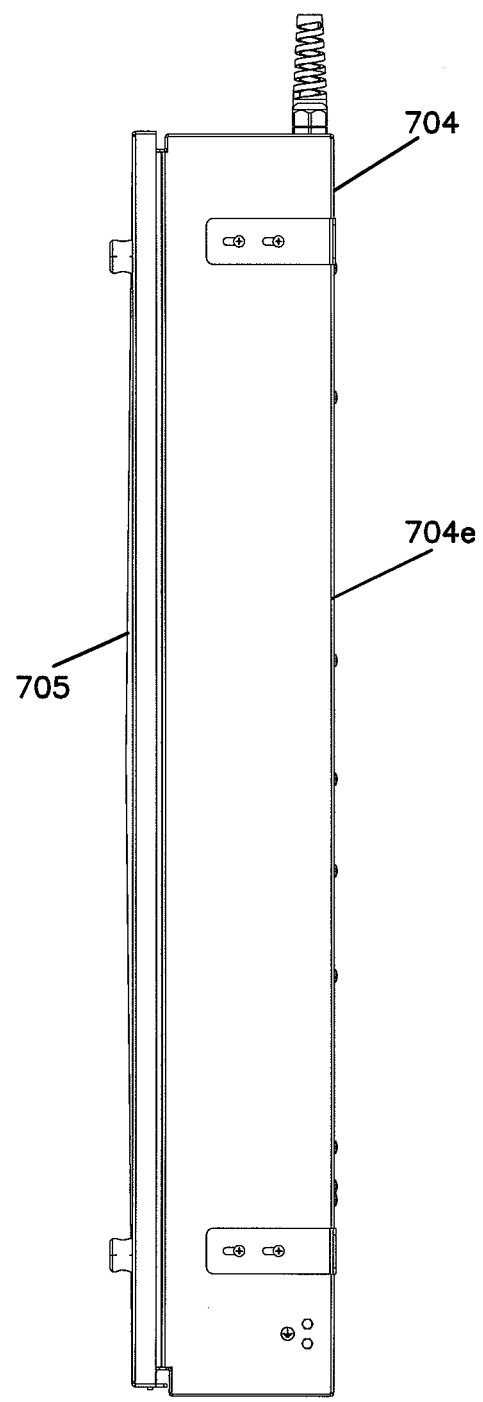
FIG. 24 is a front view of the example FDH of FIG. 23 in accordance with the principles of the present disclosure.
Figure 25:
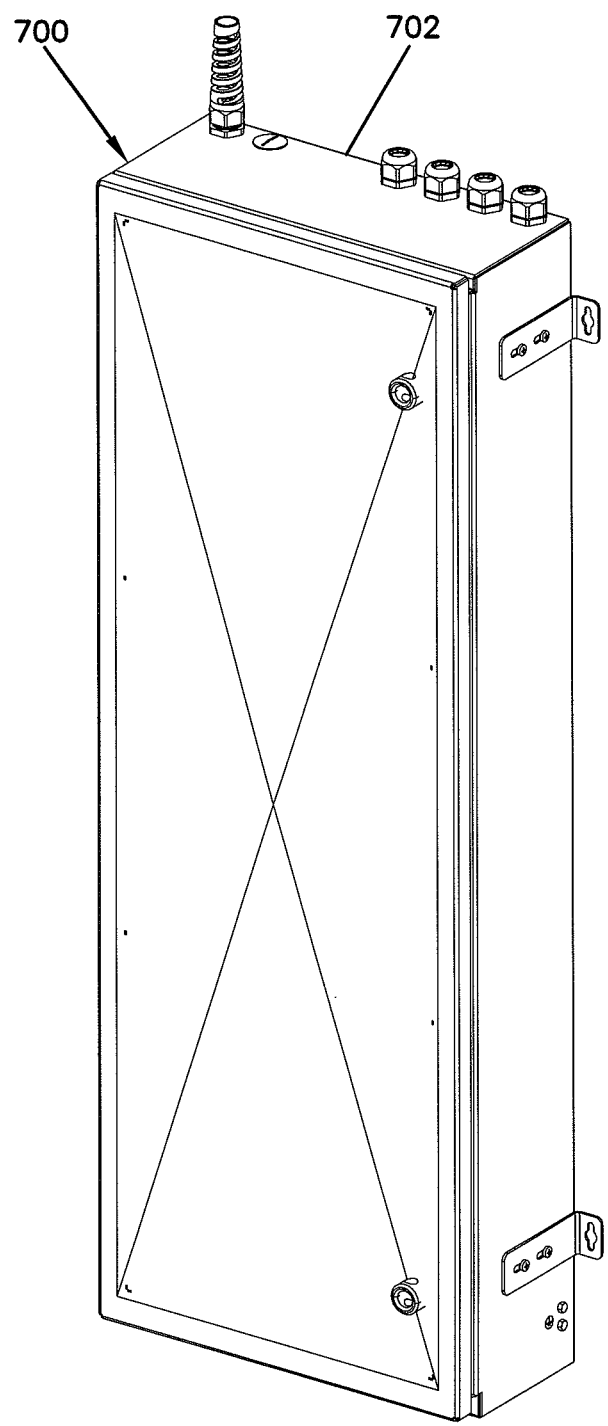
FIG. 25 is a side elevational view of the example FDH of FIG. 23 in accordance with the principles of the present disclosure.
Figure 26:
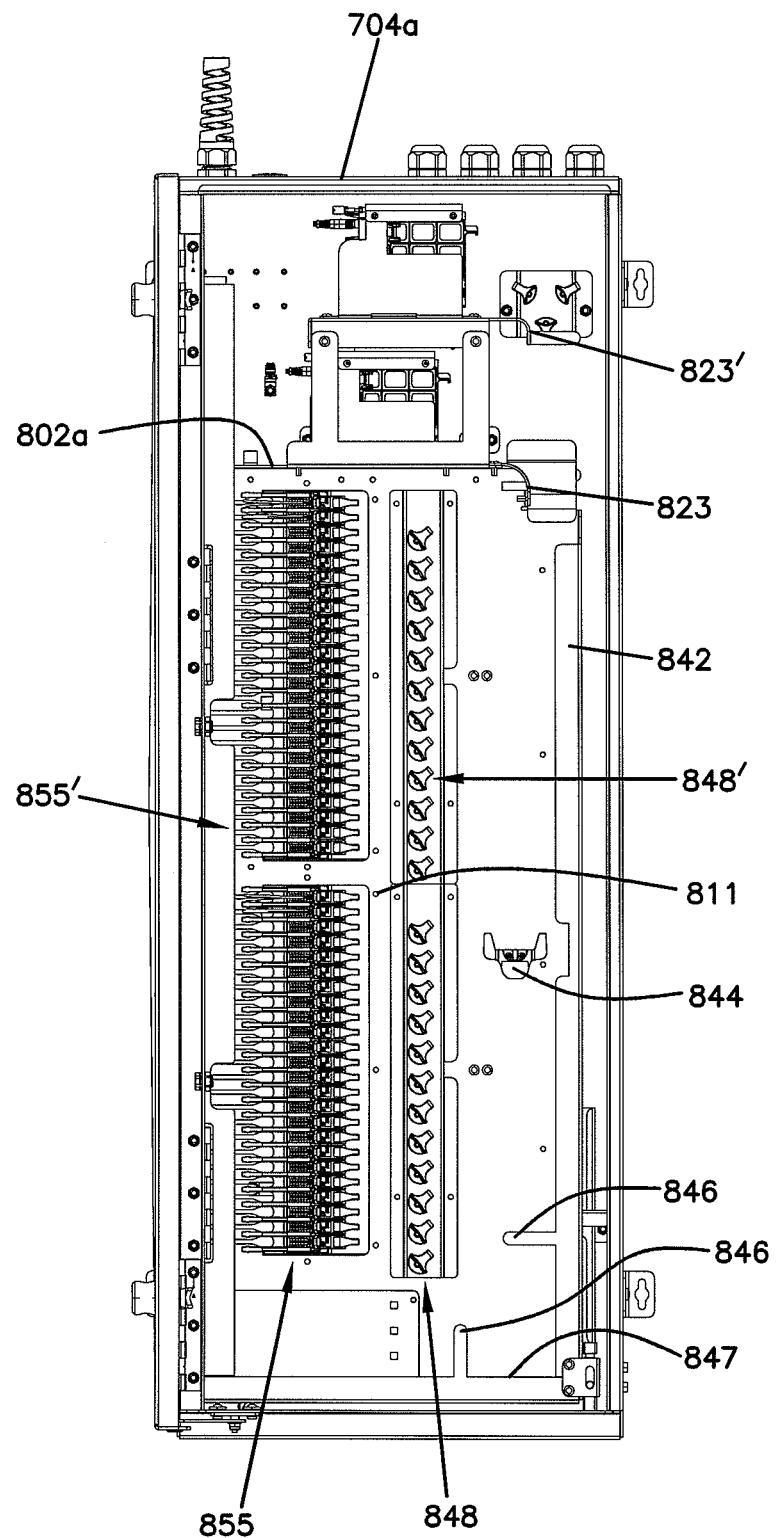
FIG. 26 is a front, top isometric view of the example FDH of FIG. 23 with the door opened and a swing frame contained within an interior of the body of the FDH in accordance with the principles of the present disclosure.
Figure 27:
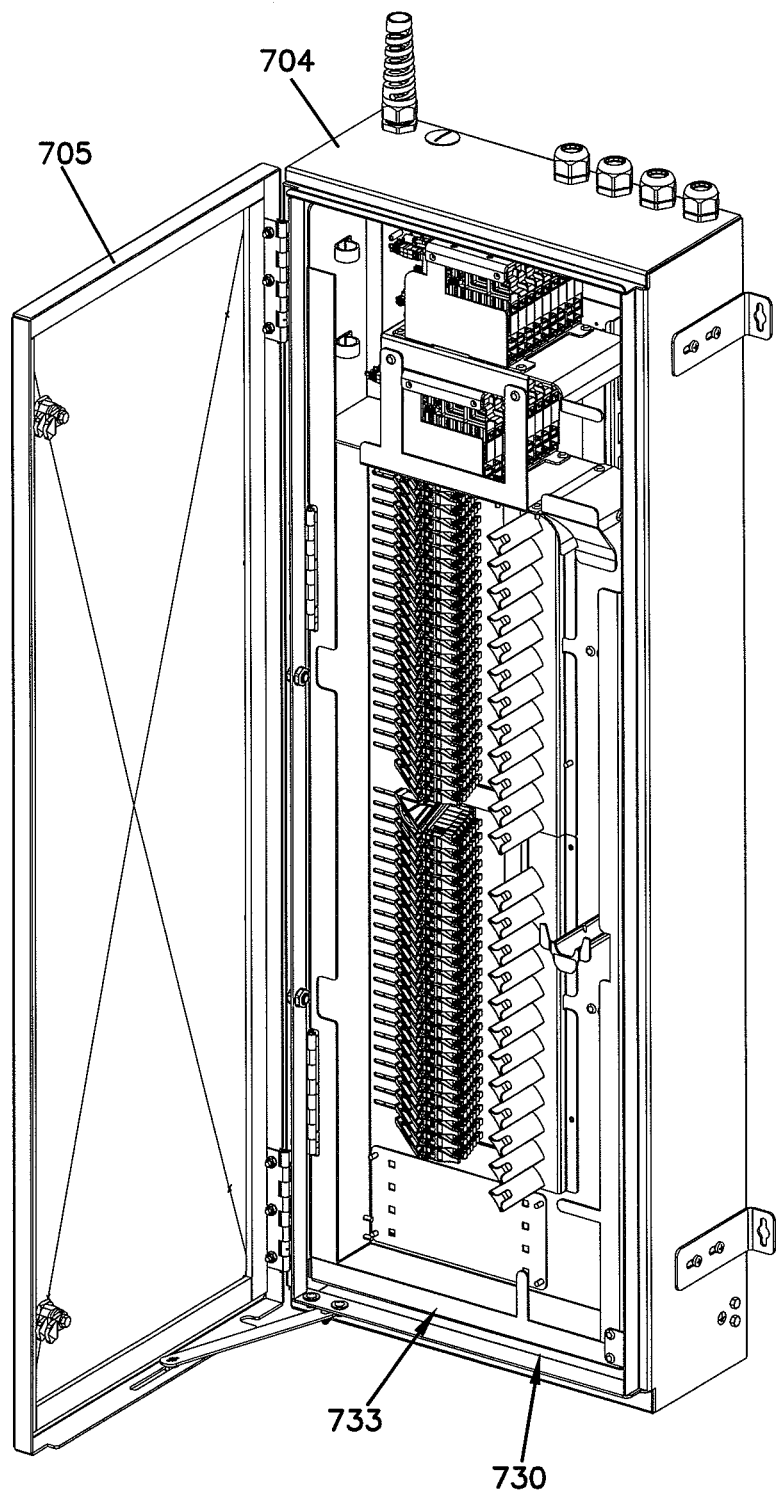
FIG. 27 is a front view of the example FDH of FIG. 26 in accordance with the principles of the present disclosure.

Referring to FIG. 22, one example swing frame 600 includes a top panel 602a, a bottom panel 602b, a first side panel 602c, and a second side panel 602d extending forwardly from a rear panel 610. A number of telecommunications components can be mounted on the swing frame 600. In the example shown in FIG. 20, a splitter mounting location 620 for mounting fiber optic splitter modules 625 is located adjacent the top of the swing frame 600. A termination field 650 is located beneath the splitter mounting location 620. A connector storage location 630 is positioned beneath the termination field 650 on the swing frame 600. One or more vertical cable management channels 640 extend vertically along the swing frame 600. Channel 640 is located at side 602d positioned opposite from the hinge side 602c of the swing frame 600. In other embodiments, however, the telecommunication components can be mounted to the swing frame 600 in different configurations.

In the example shown in FIG. 22, the top panel 602a defines the splitter mounting location 620 at which a splitter module housing 622 can be mounted. One or more splitter modules 625 can be installed at each splitter housing 622. An end panel 621 is positioned adjacent the splitter mounting location 620. The end panel 621 facilitates routing one or more input cables to the splitter modules 625 installed at the splitter housing 622. Splitter pigtails exiting the splitter modules 625 can be routed over a bend radius limiter 623 defining an opposite end of the top panel 602a from the end panel 621. Side panels 626-628 facilitate routing the splitter pigtails from the splitter modules 625 and over the bend radius limiter 623. Fiber optic adapters 629 are mounted at a back side of the splitter housing 622. The fiber optic adapters 629 couple connectors 631 of the input cables to corresponding connectors mounted to the splitter modules 625.

The splitter pigtails are routed through the cable management channels 640 before being optically coupled to either the termination field 650 or the connector storage location 630. In some embodiments, the cable management channels 640 includes a side cable management channel 641 extending along the second side 602d of the swing frame 600. In general, the side cable management channel 641 facilitates storage of excess length of the splitter pigtails.

In the example shown, a cover flange 643, side flanges 644, and a bottom flange 645 define boundaries of the side cable management channel 641. In one embodiment, the side cable management channel 641 can include a separation panel 642 extending vertically along the second side 602d of the swing frame 600 to divide the channel 641 into a first side and a second side. Splitter pigtails can be routed over the bend radius limiter 623 of the splitter mounting location 620, directed downwardly along the first side of the side cable management channel 641, hung in a half loop at the bottom flange 645, and routed upwardly along a second side of the channel 641 to a front side of the swing frame 600.

At the front side, additional excess length of the pigtails can be taken up by one or more bend radius limiters extending forwardly from the rear panel 610 of the swing frame 600. In the example shown, the excess length of the splitter pigtails can be routed over a first bend radius limiter 646, which extends from the rear panel 610 adjacent the top of the swing frame 600, and around a second bend radius limiter 647 positioned below the first bend radius limiter 646. Angled bend radius limiters 648 can be arranged along a side of the termination field 650 to facilitate routing of splitter pigtails to specific rows of the termination field 650. Tabs 649 can cooperate with a bottom lip protruding upwardly from the bottom panel 602b to inhibit portions of the splitter pigtails from spilling over the front of the swing frame 600.

In some embodiments, connectorized ends of the splitter pigtails are routed to the storage location 630 when first installed on the swing frame 600. In the example shown, the storage location 630 is defined by a storage panel 635 coupled to the rear panel 610. The storage panel 635 defines openings 631 enabling one or more storage modules to be mounted to the storage panel 635. In one embodiment, the openings 631 are sized and configured to receive a tab and latching mechanism of the storage modules. In another embodiment, the openings 631 are sized and configured to enable storage modules to be mounted within the openings 631. In other embodiments, the storage modules can be otherwise installed at the storage location 630.

When a signal is to be sent to a subscriber location, a splitter pigtail can be routed from the storage location 630 to a first end of an appropriate adapter at the termination field 650 for optical coupling to a fiber extending from a second end of the adapter that is optically linked to a distribution cable routed to a subscriber location. In some embodiments, the termination field 650 includes one or more adapter modules 655 mounted to a termination panel 651. In the example shown, the adapter modules 655 are positioned in a vertical column. Other configurations of adapter modules 655 can be utilized, however.

In general, the adapter modules 655 move (e.g., slide) from a retracted position to an extended position. For example, in some embodiments, the adapter modules 655 can be oriented to slide at least partially in a forward-to-rearward direction. Indeed, in some example embodiments, the adapter modules 655 slide mainly in a forward-to-rearward direction. In fact, in some embodiments, the adapter modules 655 slide completely in a forward-to-rearward direction.

The termination panel 651 is configured to be installed on the rear panel 610 of the swing frame 600. For example, the termination panel 651 can mount over an opening 612 defined in the rear panel 610. In some embodiments, the termination panel 651 includes openings 652 through which fasteners (e.g., screws, rivets, pegs, etc.) can be inserted to securely couple the termination panel 651 to a back side of the rear panel 610 with the adapter modules 655 projecting forwardly through the opening 612. When the termination panel 651 is mounted to the rear panel 610, the opening 652 are located adjacent a first edge 611 of the opening 612. In certain embodiment, the termination panel 651 also includes tabs 654 defining openings 653 that align with openings 614 in the rear panel. Fasteners can be inserted through the tab openings 653 and rear panel openings 614 to further couple the termination panel 651 to the rear panel 610. In one embodiment, the tabs 654 extend from a top and bottom of the termination panel 651.

In general, individually jacketed fibers optically coupled/linked to a subscriber distribution cable are routed from the sliding adapter modules 655, through the rear panel 610, to the rear side of the swing frame 600. In some embodiments, the jacketed fibers can be pre-cabled on the adapter modules 655 prior to installation of the termination field 650 on the swing frame 600. In such embodiments, the jacketed fibers can be inserted through the opening 612 defined in the rear panel 610 when the termination field 650 is secured to the rear panel 610. To facilitate organization of the jacketed fibers, a second edge 613 the rear panel 610 can include fingers 615 defining slots 616 therebetween into which the jacketed fibers can be slid during installation. In one embodiment, each slot 616 can hold jacketed fibers associated with one adapter module 655. In another embodiment, each slot 616 can hold jacketed fibers associated with two or more adapter modules 655. Fan outs 657 are mounted to the back side of the termination panel 651 adjacent the slots 616 for fanning out and individually jacketing the fibers corresponding to the subscriber distribution cable. In certain embodiments the jacketed fibers can include a single fiber enclosed within a 2 mm jacket and also can include aramid yarn reinforcement positioned between the jacket and the fiber. The jacketed fibers also may include a buffer layer or tube positioned between each optical fiber and the reinforcing layer.

In some embodiments, one or more fingers 615 can define an opening 617 configured to receive a fastener to aid in securing the termination panel 651 to the rear panel 610. In the example shown, each finger 615 defines an opening 617. A fastener can be inserted through the termination panel 651 and through the opening 617 in the finger 615. In one embodiment, a fastener can extend through one of the adapter modules 655, the termination panel 651, and the opening 617 in the finger 615. In other embodiments, the jacketed fibers can be otherwise routed to the rear side of the swing frame 600.

FIGS. 23-29 show other embodiments of fiber distribution hubs 700 and 700'. The fiber distribution hubs each include a generally rectangular, low profile enclosure 702 (see FIGS. 23-25). The enclosure 702 has a generally rectangular main body 704 having a top wall 704a (FIG. 23), a bottom wall 704b (FIG. 23), a first side wall 704c (FIG. 23), a second side wall 704d (FIG. 23), and a back wall 704e (FIG. 24) defining an interior. The body 704 also defines a generally open front side 704f (FIG. 28) opposite the back wall 704e. The enclosure 702 also includes a door 705 typically mounted at the open front side 704f of the main body 704. The door 705 is pivotally movable from an open position (see FIG. 27) in which the interior of the enclosure 702 can be accessed to a closed position (see FIGS. 23-25) in which the door 705 at least partially covers the open front side 704f of the main body 704. A seal can be provided at the interface between the door 705 and the main body 704 for sealing the enclosure 702 when the door 705 is closed.

The enclosure 702 defines at least a first entrance port 703 through which a feeder cable can enter the body 704 and at least a first exit port 707 through which a subscriber distribution cable can exit the body 704. In some embodiments, the enclosure 702 can define additional entrance and/or exit ports. In the example shown, the first entrance port 703 and two exit ports 707 extend through the top panel 702a of the enclosure body 704. In other embodiments, however, the entrance port 703 and exit port 707 can be defined in any of the walls 702a-702e of the body 704. In one embodiment, one or more of the ports 703m 707 include strain relief members extending outwardly from the body 704.

In general, the enclosure 702 can enclose one or more telecommunications components including telecommunications circuits (e.g., optical outputs to subscribers).

For example, the enclosure 702 shown in FIGS. 23-28 is configured to hold approximately 288 telecommunications circuits. Other embodiments can be configured to hold greater or fewer circuits. Typically, the enclosure 702 has a depth of less than about 9 inches. In some embodiments, the enclosure 702 has a depth of less than about 8 inches. Indeed, in some embodiments, the enclosure 702 has a depth of less than about 7 inches.

The enclosure body 704 includes cable interface components at which incoming feeder cable(s) and outgoing distribution cable(s) can be optically coupled together within the enclosure 702. In general, the hub 700 includes at least a first feeder cable interface 742 and at least first and second distribution cable interfaces 744, 746. In the examples shown in FIGS. 28 and 29, the first feeder cable interface 742 includes a splice tray. In other embodiments, however, the first feeder cable interface 742 can include one or more adapter modules for coupling connectorized ends of the feeder cable to input leads of splitter modules.

Figure 28:
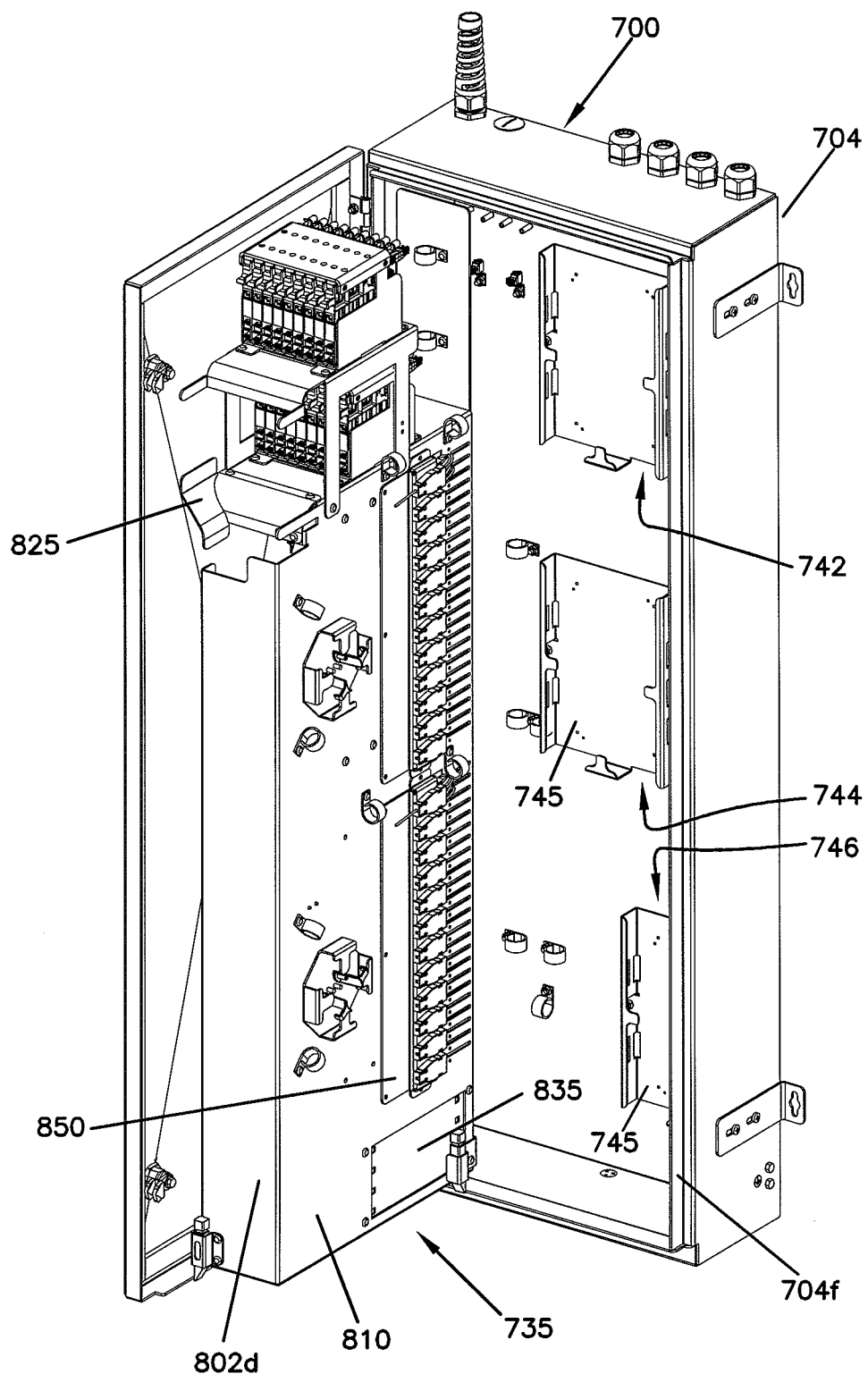
FIG. 28 is a front, top isometric view of the example FDH of FIG. 26 with the swing frame pivoted through an access opening defined in a front of the body of the FDH in accordance with the principles of the present disclosure.
Figure 29:
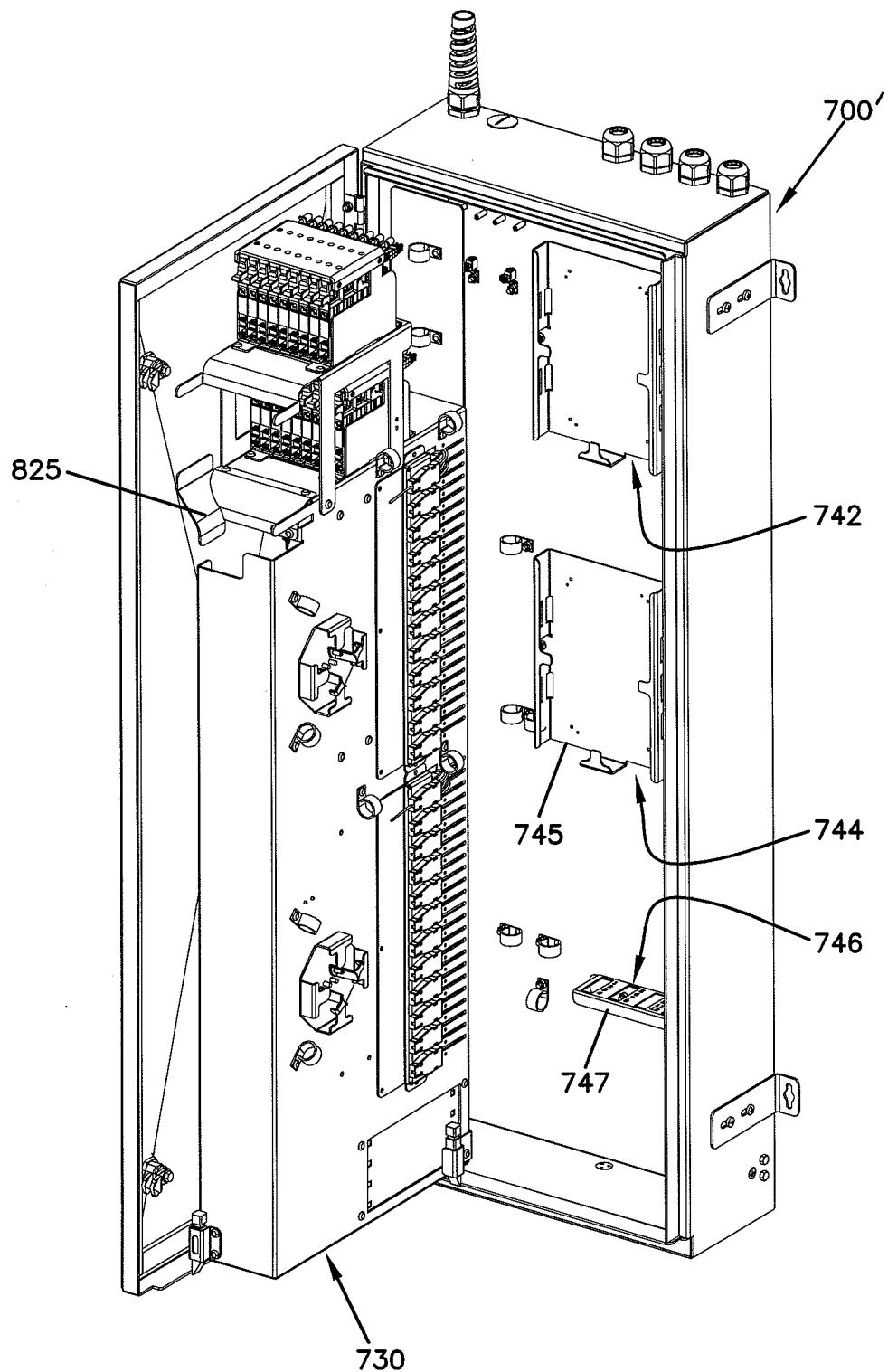
FIG. 29 is a front, top isometric view of the example FDH of FIG. 28 having multi-termination connector-type subscriber distribution cable interface in accordance with the principles of the present disclosure.

In the example fiber distribution hub 700 shown in FIG. 28, the first distribution cable interface 744 and the second distribution cable interface 746 include splice trays 745. In other embodiments, however, the first and/or second distribution cable interface 744, 746 can include another type of interface. For example, the second distribution cable interfaces 744, 746 can include one or more adapters for optically coupling connectorized ends of intermediate fibers routed to a termination panel to one or more distribution cables. In the example fiber distribution hub 700' shown in FIG. 29, the first distribution cable interface 744 includes a splice tray 745 and the second distribution cable interface 746 includes a panel or shelf 747 at which one or more adapters configured to receive multi-termination (MT) connectors can be installed. In another embodiment, adapters for single-termination connectors can be installed at the shelf 747. In still other embodiments, the enclosure 702 can include greater or fewer distribution cable interfaces 744, 746.

Referring back to FIGS. 26-28, the fiber distribution hub 700 includes a swing frame 730 pivotally mounted within the enclosure 702 (see FIG. 28). The swing frame 730 has a front side 733 (FIG. 27) and a rear side 735 (FIG. 28). In one embodiment, the swing frame 730 is connected to the enclosure 702 by a hinge arrangement defining a vertical hinge axis located adjacent a front corner of the main body 704 of the low profile enclosure 702. The swing frame 730 is configured to be moved between a first position (see FIG. 27) in which the swing frame 730 is arranged completely within the main body 704 of the enclosure 702 and a second position (see FIG. 28) in which the swing frame 730 is pivoted through the open front side 704f of the main body 704 such that the rear side 735 of the swing frame 730 is accessible.

Figure 30:
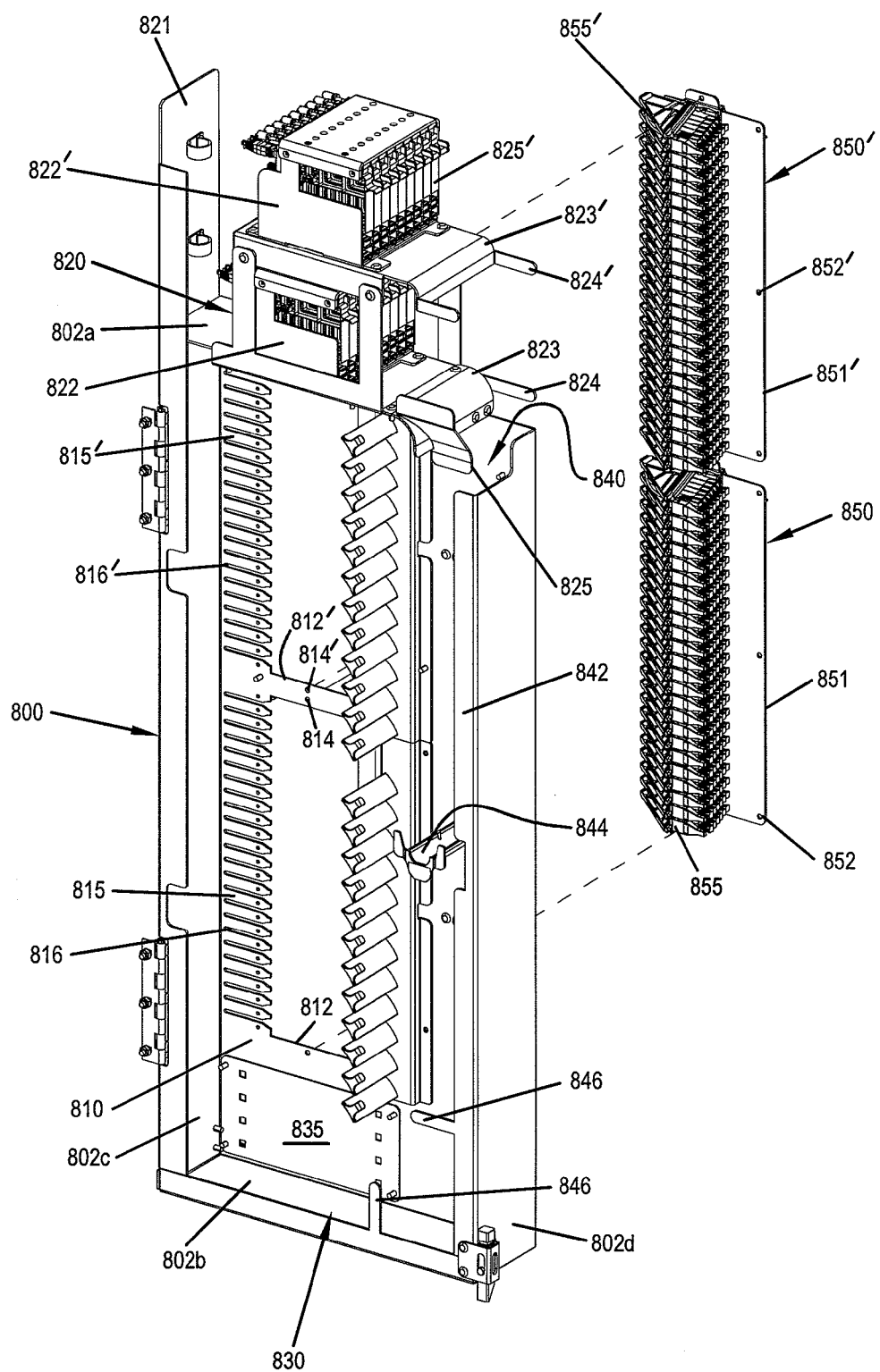
FIG. 30 is a front, top isometric view of one example swing frame configured to mount within an FDH in accordance with the principles of the present disclosure.

Referring to FIG. 30, one example swing frame 800 includes a top panel 802a, a bottom panel 802b, a first side panel 802c, and a second side panel 802d extending forwardly from a rear panel 810. A number of telecommunications components can be mounted on the swing frame 800. In the example shown in FIG. 31, a splitter mounting location 820 for mounting fiber optic splitter modules 825 is located adjacent the top of the swing frame 800. A termination field 850 is located beneath the splitter mounting location 820. A connector storage location 830 is positioned beneath the termination field 850 on the swing frame 800. One or more vertical cable management channels 840 extend vertically along the swing frame 800. In other embodiments, however, the telecommunication components can be mounted to the swing frame 800 in different configurations.

In the example shown in FIG. 31, the top panel 802a defines the splitter mounting location 820 at which a first splitter module housing 822 and a second splitter module housing 822' can be mounted. In the example shown, the second splitter module housing 822' is stacked above the first splitter module housing 822. In other embodiments, the splitter module housings 822, 822' can be otherwise positioned adjacent each other. In still other embodiments, greater or fewer splitter module housings can be installed at the splitter mounting location 820. One or more splitter modules 825 can be installed at each splitter housing 822, 822'.

An end panel 821 is positioned adjacent the splitter mounting location 820. The end panel 821 facilitates routing one or more input cables to the splitter modules 825 installed at the splitter housings 822, 822'. Splitter pigtails exiting the splitter modules 825 installed at the first splitter module housing 822 can be routed over a bend radius limiter 823 defined at an opposite end of the top panel 802a from the end panel 821. Splitter pigtails exiting the splitter modules 825 installed at the second splitter module housing 822' can be routed over a second bend radius limiter 823' extending outwardly from the bottom of the splitter module housing 822'. Retention tabs 824, 824' facilitate routing the splitter pigtails from the splitter modules 825 and over the bend radius limiters 823, 823'.

The splitter pigtails are routed along a front side of the swing frame 800 through the cable management channel 840 before being optically coupled to either the termination field 850 or the connector storage location 830. In general, the side cable management channel 840 facilitates storage of excess length of the splitter pigtails. In some embodiments, the cable management channel 840 is defined by the rear panel 810 of the swing frame 800, the side panel 802d of the swing frame 800, and a front flange 842 extending inwardly from the side panel 802d. Tabs 846 can cooperate with a bottom lip 847 protruding upwardly from the bottom panel 802b of the swing frame 800 to inhibit portions of the splitter pigtails from spilling over the front of the swing frame 800.

Additional excess length of the pigtails can be taken up by one or more bend radius limiters extending forwardly from the rear panel 810 of the swing frame 800. In the example shown, the excess length of the splitter pigtails can be routed around a first bend radius limiter 844, which extends from the rear panel 810 adjacent a middle region of the swing frame 800. Angled bend radius limiters 848 can be arranged along a side of the termination field 850 to facilitate routing of splitter pigtails to specific rows of the termination field 850. In the example shown, the angled bend radius limiters 848 are arranged in a single vertical row along the side of the termination field 850. Other configurations of bend radius limiters 848 that direct splitter pigtails to appropriate areas of the termination field 850, however, are consistent with the scope of the disclosure.

In some embodiments, connectorized ends of the splitter pigtails are routed to the storage location 830 when first installed on the swing frame 800. In the example shown, the storage location 830 is defined by a storage panel 835 coupled to the rear panel 810. One or more storage modules can be mounted to the storage panel 835. When a signal is to be sent to a subscriber location, a splitter pigtail can be routed from the storage location 830 to the termination field 850 for optical coupling to a subscriber distribution cable.

In some embodiments, the termination field 850 includes one or more adapter modules mounted to one or more termination panels. Each adapter module is configured to slide away from the rear panel 810 of the swing frame 800 to enable access to the connectors plugged into the adapter modules. In general, the adapter modules move (e.g., slide) from a retracted position to an extended position. For example, in some embodiments, the adapter modules can be oriented to slide at least partially in a forward-to-rearward direction. Indeed, in some example embodiments, the adapter modules slide mainly in a forward-to-rearward direction. In fact, in some embodiments, the adapter modules slide completely in a forward-to-rearward direction.

In the example shown in FIG. 31, a first group of adapter modules 855 are positioned in a vertical column on a first termination panel 851 and a second group of adapter modules 855' are positioned in a vertical column on a second termination panel 851'. In other embodiments, greater or fewer groups of adapter modules can be arranged in any suitable configuration. Each termination panel 851, 851' is configured to be installed on the rear panel 810 of the swing frame 800. For example, the first termination panel 851 can mount at a first opening 812 defined in the rear panel 810 and the second termination panel 851' can mount at a second opening 812' defined in the rear panel 810.

In some embodiments, the termination panels 851, 851' include openings 852, 852', respectively, through which fasteners (e.g., screws, rivets, pegs, etc.) can be inserted to securely couple the termination panels 851, 851' to at least first vertical edges of the opening 812, 812', respectively. In certain embodiment, the termination panels 851, 851' also include tabs 854, 854' defining openings 853, 853' that align with openings 814, 814', respectively, in the rear panel 810. Fasteners can be inserted through the tab openings 853, 853' and rear panel openings 814, 814' to further couple the termination panels 851, 851' to the rear panel 810. In one embodiment, the tabs 854, 854' extend from a top and bottom of the termination panels 851, 851'.

Jacketed fibers corresponding to subscriber distribution cables are routed from the sliding adapter modules 855, 855', through the rear panel 810, to the rear side of the swing frame 800. In some embodiments, the jacketed fibers can be pre-cabled on the adapter modules 855, 855' prior to installation of the termination panels 851, 851' on the swing frame 800. In such embodiments, the jacketed fibers can be inserted through the openings 812, 812' defined in the rear panel 810 when the termination panels 851, 851' are secured to the rear panel 810. To facilitate organization of the jacketed fibers, second vertical edges of the openings 812, 812' can include fingers 815, 815' defining slots 816, 816', respectively, therebetween into which the jacketed fibers can be slid during installation. In one embodiment, each slot 816, 816' can hold jacketed fibers associated with one adapter module 855, 855', respectively. In another embodiment, each slot 816, 816' can hold jacketed fibers associated with two or more adapter modules 855, 855'. In some embodiments, one or more fingers 815, 815' can define an opening configured to receive a fastener to aid in securing the termination panel 851, 851' to the rear panel 810.

Embodiments of the above described FDH are suitable for use within buildings or multi-dwelling units. For example, some embodiments are suitable to mount inside closets or other enclosed spaces of limited size. Aspects of the FDH facilitate access to optical components within the FDH enclosure. For example, a pivoting swing frame facilitates access to components stored at the rear of the FDH enclosure. Sliding termination modules facilitate access to individual terminated fibers while allowing for dense storage of the coupled fibers.

The above specification provides examples of how certain aspects may be put into practice. It will be appreciated that the aspects can be practiced in other ways than those specifically shown and described herein without departing from the spirit and scope of the present disclosure.

What is claimed is:
1. A fiber distribution hub comprising:
an enclosure defining an interior region, the enclosure including a depth that extends from a front to a back of the enclosure, the front of the enclosure including an access opening for accessing the interior of the enclosure, the enclosure also including a front door for at least partially covering the access opening, the depth of the enclosure being less than 9 inches, wherein a width of the enclosure is at least 1.5 times the depth and a height of the enclosure is at least 3 times the depth;

a splitter module mounting location positioned within the enclosure, the splitter module mounting location being adapted to mount one or more splitter modules within the enclosure;

a connector storage location positioned within the enclosure for use in storing unused fiber optic connectors;

a pivotal structure pivotally mounted within the enclosure; and a termination field including at least one hundred forty-four fiber optic adapters, the termination field being carried by the pivotal structure, the termination field including a plurality of adapter modules each including a plurality of fiber optic adapters, each adapter module being movable relative to the pivotal structure between an extended position and a retracted position.

2. The fiber distribution hub of claim 1, wherein at least one splitter module is mounted at the splitter module mounting location, the splitter module including a housing enclosing an optical splitter, the splitter module including a plurality of connectorized pigtails that extend away from the housing for carrying a signal split at the optical splitter, the connectorized pigtails having connectorized ends, the connectorized pigtails being long enough to extend from the splitter module mounting location to the termination field so that the connectorized ends can be inserted into the fiber optic adapters of the termination field, the connectorized pigtails also being long enough to extend from the splitter module mounting location to the connector storage location so that the connectorized ends can be stored at the connector storage location.

3. The fiber distribution hub of claim 2, further comprising a connector holder adapted for receiving a plurality of the connectorized ends of the pigtails of the splitter module, the connector holder being mounted at the connector storage location.

4. The fiber distribution hub of claim 1, wherein the fiber distribution hub includes at least 288 circuits.

5. The fiber distribution hub of claim 1, wherein the fiber distribution hub includes at least 576 circuits.

6. The fiber distribution hub of claim 1, wherein the width is at least two times the depth and the height is at least four times the depth.

7. The fiber distribution hub of claim 1, wherein the pivotal structure includes a swing frame having a width that generally corresponds to the width of the enclosure, a height that generally corresponds to the height of the enclosure, and a depth that is shorter than the depth of the enclosure to accommodate cables and cable management structures provided within the interior of the enclosure at a location behind the swing frame.

8. The fiber distribution hub of claim 7, wherein the door has a first vertical pivot axis, wherein the swing frame has a second vertical pivot axis positioned adjacent to the first vertical pivot axis, wherein the splitter module mounting location is located at a top of the swing frame, and wherein the swing frame defines a vertical cable routing path at an end of the swing frame positioned distal from the second vertical pivot axis.

9. The fiber distribution hub of claim 1, wherein the depth of the enclosure is less than 8 inches.

10. The fiber distribution hub of claim 1, wherein the fiber distribution hub includes at least 64 subscriber termination circuits.

11. The fiber distribution hub of claim 1, wherein the fiber distribution hub includes at least 72 subscriber termination circuits.

12. The fiber distribution hub of claim 1, wherein the fiber distribution hub includes at least 96 subscriber termination circuits.

13. The fiber distribution hub of claim 1, wherein the fiber distribution hub includes at least 144 subscriber termination circuits, wherein the height of the enclosure is at least four times the depth of the enclosure, and wherein the width of the enclosure is at least two times the depth of the enclosure.

14. The fiber distribution hub of claim 1, wherein the height of the enclosure is at least five times the depth of the enclosure, and wherein the width of the enclosure is at least two times the depth of the enclosure.

15. A fiber distribution hub comprising:
an enclosure defining an interior region, the enclosure including a depth that extends from a front to a back of the enclosure, the front of the enclosure including an access opening for accessing the interior of the enclosure, the enclosure also including a front door for at least partially covering the access opening, the depth of the enclosure being less than 9 inches;

a splitter module mounting location positioned within the enclosure, the splitter module mounting location being adapted to mount one or more splitter modules within the enclosure;

a pivotal structure pivotally mounted within the enclosure; and a termination field including at least one hundred forty-four fiber optic adapters, the termination field being carried by the pivotal structure, the termination filed including a plurality of adapter modules each including a plurality of fiber optic adapters, each adapter module being movable relative to the pivotal structure between an extended position and a retracted position.

16. The fiber distribution hub of claim 15, wherein at least one splitter module is mounted at the splitter module mounting location, the splitter module including a housing enclosing an optical splitter, the splitter module including a plurality of connectorized pigtails that extend away from the housing for carrying a signal split at the optical splitter, the connectorized pigtails having connectorized ends, the connectorized pigtails being long enough to extend from the splitter module mounting location to the termination field so that the connectorized ends can be inserted into the fiber optic adapters of the termination field.

17. The fiber distribution hub of claim 15, wherein the fiber distribution hub includes at least 288 circuits.

18. The fiber distribution hub of claim 15, wherein the fiber distribution hub includes at least 576 circuits.

19. The fiber distribution hub of claim 15, wherein the width is at least two times the depth and the height is at least four times the depth.

* * * * *